United States Patent
Qin et al.

(10) Patent No.: US 12,233,856 B2
(45) Date of Patent: Feb. 25, 2025

(54) VEHICLE CONTROL METHOD

(71) Applicant: Shenzhen Yinwang Intelligent Technologies Co., Ltd., Shenzhen (CN)

(72) Inventors: Li Qin, Shenzhen (CN); Wen Hu, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 408 days.

(21) Appl. No.: 17/696,545

(22) Filed: Mar. 16, 2022

(65) Prior Publication Data

US 2022/0203971 A1    Jun. 30, 2022

Related U.S. Application Data

(63) Continuation of application No. PCT/CN2020/100089, filed on Jul. 3, 2020.

(30) Foreign Application Priority Data

Sep. 16, 2019 (CN) .......................... 201910872276.1
Dec. 31, 2019 (CN) .......................... 201911417586.0

(51) Int. Cl.
*B60W 30/09* (2012.01)
*B60W 30/085* (2012.01)
(Continued)

(52) U.S. Cl.
CPC .......... *B60W 30/09* (2013.01); *B60W 30/085* (2013.01); *B60W 30/18109* (2013.01);
(Continued)

(58) Field of Classification Search
CPC ............... B60W 30/09; B60W 30/085; B60W 30/18109; B60W 40/105; B60W 60/0015;
(Continued)

(56) References Cited

U.S. PATENT DOCUMENTS 11,604,470 B2 *   3/2023   Nister ...................... G05D 1/65
11,970,161 B2 *   4/2024   Sorin ................ B60W 60/0023
(Continued)

FOREIGN PATENT DOCUMENTS

CN          103921790 A       7/2014
CN          105102291 A      11/2015
(Continued)

*Primary Examiner* — Aniss Chad
*Assistant Examiner* — Christopher George Fees
(74) *Attorney, Agent, or Firm* — Leydig, Voit & Mayer, Ltd.

(57) ABSTRACT

Disclosed is a vehicle control method, including: obtaining a first velocity planned for an intelligent vehicle to travel in a first area; and obtaining a second velocity planned for the vehicle to travel in the first area, where the second velocity is obtained based on a collision potential energy, the first velocity and the second velocity each include a direction and a magnitude, and the first velocity, the second velocity, and a risk of a collision between the vehicle and a surrounding obstacle are used to determine an optimal velocity of the vehicle, so that the vehicle can effectively avoid the obstacle, thereby improving traveling safety of the vehicle. Also disclosed are a vehicle control apparatus, a vehicle controller, and a vehicle.

13 Claims, 18 Drawing Sheets

(51) Int. Cl.
    *B60W 30/18*     (2012.01)
    *B60W 40/105*     (2012.01)
    *B60W 60/00*     (2020.01)

(52) U.S. Cl.
    CPC ...... *B60W 40/105* (2013.01); *B60W 60/0015* (2020.02); *B60W 2554/4049* (2020.02)

(58) Field of Classification Search
    CPC ..... B60W 2554/4049; B60W 30/0953; B60W 2050/0002; B60W 2554/801; B60W 2554/802; B60W 2554/803; B60W 2554/804; B60W 2554/805; B60W 2554/806; B60W 2720/10; B60W 50/023; B60W 50/045; B60W 60/0027; B60W 30/0956; B60W 30/08; B60W 40/00
    See application file for complete search history.

(56) References Cited

U.S. PATENT DOCUMENTS

| | | | |
|---|---|---|---|
| 12,043,284 B2 * | 7/2024 | Ostafew | G08G 1/165 |
| 2004/0061598 A1 * | 4/2004 | King | B60R 21/013 |
| | | | 340/435 |
| 2014/0118132 A1 | 5/2014 | Braunberger et al. | |
| 2014/0142798 A1 * | 5/2014 | Guarnizo Martinez | B60W 10/18 |
| | | | 701/23 |
| 2015/0353082 A1 * | 12/2015 | Lee | B60W 10/20 |
| | | | 701/41 |
| 2017/0123428 A1 | 5/2017 | Levinson et al. | |
| 2017/0327094 A1 | 11/2017 | Inoue et al. | |
| 2018/0126983 A1 * | 5/2018 | Beauvais | B60W 10/20 |
| 2018/0366001 A1 | 12/2018 | Matsunaga | |
| 2020/0174481 A1 * | 6/2020 | Van Heukelom | G01C 21/3407 |
| 2020/0255035 A1 * | 8/2020 | Sonntag | G08G 1/167 |
| 2020/0369270 A1 * | 11/2020 | Antonsson | G08G 1/0129 |

FOREIGN PATENT DOCUMENTS

| | | |
|---|---|---|
| CN | 108202740 A | 6/2018 |
| CN | 112590778 A | 4/2021 |
| DE | 102015117976 A1 | 4/2017 |
| EP | 3474255 A1 | 4/2019 |
| EP | 3730366 A1 | 10/2020 |
| KR | 20150096924 A | 8/2015 |
| KR | 20180006635 A | 1/2018 |
| WO | 2019000391 A1 | 1/2019 |
| WO | 2019151094 A1 | 8/2019 |

* cited by examiner

VEHICLE CONTROL METHOD

CROSS-REFERENCE TO RELATED APPLICATIONS

This application is a continuation of International Application No. PCT/CN2020/100089, filed on Jul. 3, 2020, which claims priority to Chinese Patent Application No. 201910872276.1, filed on Sep. 16, 2019 and Chinese Patent Application No. 201911417586.0, filed on Dec. 31, 2019. All of the aforementioned patent applications are hereby incorporated by reference in their entireties.

TECHNICAL FIELD

This application relates to the vehicle field, and in particular, to an intelligent vehicle anti-collision method, apparatus, and controller, and an intelligent vehicle.

BACKGROUND

As an artificial intelligence (AI) technology is gradually applied to the intelligent vehicle field, increasingly more intelligent vehicles implement automated driving by using an artificial intelligence algorithm represented by deep learning. In a conventional technology, an in-vehicle sensor is used to collect information about a vehicle in front, and an in-vehicle controller determines, based on a braking distance and a minimum braking time, whether a collision is to occur. Once the controller determines that a collision is to occur, a braking operation of the intelligent vehicle is performed. In the foregoing anti-collision solution, a decision on whether to brake is made only based on a distance between the ego-vehicle and another vehicle and the minimum braking time, which may easily cause mis-determining or missed determining, thereby causing a person to be injured or the vehicle to be damaged. In addition, in a complex scenario, if collisions possibly occur in a plurality of directions or some vehicles travel against the direction of traffic, performing only a braking operation may not effectively avoid a collision with another vehicle. Therefore, how to provide a more effective vehicle control method for avoiding an obstacle becomes an urgent technical problem to be solved.

SUMMARY

This application provides a vehicle control method and apparatus, a vehicle controller, and an intelligent vehicle, which are applied to an intelligent vehicle, so that a more effective anti-collision function of the intelligent vehicle can be implemented, thereby improving safety of the intelligent vehicle in an automated driving process.

According to a first aspect, a vehicle control method is provided, where the method includes: obtaining a first velocity planned for the intelligent vehicle to travel in a first area, where the first area is an area in a process in which the intelligent vehicle travels to a destination; and obtaining a second velocity planned for the intelligent vehicle to travel in the first area, where the second velocity is obtained based on a collision potential energy, and the first velocity and the second velocity each include a direction and a magnitude; and the first velocity, the second velocity, and a risk of a collision between the intelligent vehicle and a surrounding obstacle are used to determine an optimal velocity of the intelligent vehicle, and the optimal velocity includes a magnitude and a direction. In the foregoing method, the intelligent vehicle may separately plan, by using a redundancy design of dual channels, a first velocity and a second velocity for the intelligent vehicle to travel in a same area, and then determine an optimal velocity based on a risk of a collision between the intelligent vehicle and a surrounding obstacle, to implement that the intelligent vehicle avoids the surrounding obstacle at the optimal velocity, so as to avoid a collision between the ego-vehicle and the surrounding obstacle, reduce damage to a passenger in the intelligent vehicle and the vehicle, and improve safety of the intelligent vehicle in an automated driving process.

In a possible implementation, the collision potential energy is used to identify a trend of a collision between the surrounding obstacle of the intelligent vehicle and the intelligent vehicle. In this application, a safe channel may identify, by using a collision potential energy, an obstacle that may collide with the ego-vehicle, and further determine a first velocity based on the collision potential energy, so that controlling the intelligent vehicle to travel at the first velocity can effectively implement an obstacle avoidance process.

In another possible implementation, the method further includes: determining the optimal velocity of the intelligent vehicle for collision avoidance based on the first velocity, the second velocity, and the risk of a collision between the intelligent vehicle and the surrounding obstacle, where the optimal velocity includes a magnitude and a direction. According to the description in the foregoing method, in the vehicle control method provided in this application, the intelligent vehicle may select a velocity from the first velocity and the second velocity as the optimal velocity based on the risk of a collision between the ego-vehicle and the obstacle, so as to control the intelligent vehicle to travel at the velocity, thereby effectively avoiding a collision with the surrounding obstacle and improving safety of the intelligent vehicle.

In another possible implementation, the method further includes: receiving a velocity control instruction, and controlling the intelligent vehicle by using the velocity control instruction to travel. In the method provided in this application, the intelligent vehicle may present the first velocity and the second velocity to a driver by using an interface display screen or the like, and the driver selects the first velocity or the second velocity to control the intelligent vehicle to travel. In this case, the velocity selected by the driver may be sent in a manner of a velocity control instruction to a controller of the intelligent vehicle, and the controller of the intelligent vehicle controls the intelligent vehicle based on the velocity control instruction to travel.

Optionally, the driver may alternatively switch a driving mode to manual driving by using the interface display screen, and control the intelligent vehicle to travel based on an operation of the current driver. In this application, the driver is reminded of a collision risk by using the interface display screen, and the driver may directly take control of the intelligent vehicle to manually control the intelligent vehicle to travel.

In another possible implementation, when the intelligent vehicle is controlled by the controller to travel and meets a first preset condition, the optimal velocity is the first velocity. The first preset condition is that a collision potential energy of any surrounding obstacle is less than a first threshold. In the vehicle control method provided in this application, a traveling velocity of the intelligent vehicle may be determined by using a collision potential energy of an obstacle. When a direction of a collision between any obstacle and the ego-vehicle is less than the first threshold, the vehicle may be controlled to travel at a velocity determined by using a working channel. That is, when there is no obstacle having a preset collision risk, the vehicle may be controlled to travel at the velocity determined by using the working channel, so as to implement the obstacle avoidance process and improve safety of the intelligent vehicle.

In another possible implementation, when the intelligent vehicle is controlled by the controller to travel and meets a second preset condition, the optimal velocity is the second velocity. The second preset condition is that a collision potential energy of any surrounding obstacle is greater than or equal to a first threshold. In the vehicle control method provided in this application, a trend of a collision between the obstacle and the ego-vehicle is determined based on the collision potential energy of the surrounding obstacle. When a collision potential energy of any surrounding obstacle of the ego-vehicle is greater than or equal to the first threshold, the intelligent vehicle is controlled to travel at the second velocity determined by using the safe channel. That is, when there is any surrounding obstacle having the preset collision risk, the vehicle is controlled to travel at the velocity determined by using the safe channel, so as to implement the obstacle avoidance process and improve safety of the intelligent vehicle.

In another possible implementation, the intelligent vehicle may indicate a collision risk of the intelligent vehicle in at least one of the following manners: The intelligent vehicle displays a risk of a collision between the intelligent vehicle and the surrounding obstacle, the first velocity, and the second velocity by using a text on an in-vehicle display interface of the intelligent vehicle; or the intelligent vehicle broadcasts a risk of a collision between the intelligent vehicle and the surrounding obstacle, the first velocity, and the second velocity using voice; or the intelligent vehicle prompts a risk of a collision between the intelligent vehicle and the surrounding obstacle through seat vibration; or the intelligent vehicle prompts is a risk of a collision between the intelligent vehicle and the surrounding obstacle through in-vehicle lamp flashing. By using the foregoing method, message interaction between the intelligent vehicle and the driver can be implemented. For a dangerous situation, the driver can be reminded of a potential risk in time, and the driver is allowed to take over or control a traveling process of the intelligent vehicle, thereby reducing a fear brought to the driver when not being informed and improving driving experience.

Optionally, in the foregoing indication manners, the final optimal velocity for the vehicle to travel may further be presented to the driver, so that the driver learns of the obstacle avoidance process and the velocity that are planned by the vehicle, thereby adding a driver-vehicle interaction process and improving user experience.

According to content of the foregoing description, in the vehicle control method provided in this application, the safe channel and the working channel may be used to separately plan a velocity in the first area. The controller selects a velocity as the optimal velocity, or the controller receives a velocity selected by the driver, so as to control the vehicle to travel at the optimal velocity or the velocity selected by the driver, to implement an effective obstacle avoidance process and improve safety of the intelligent vehicle. Further, in the vehicle control method provided in this application, an optimal velocity that meets functional safety requirements in any area can be obtained based on a collision potential energy of an obstacle by using a potential energy decomposition and combination method, and then verification is performed by using a travelable area, to finally determine an optimal velocity of the intelligent vehicle for obstacle avoidance. A possibility of a collision between the surrounding obstacle and the ego-vehicle is comprehensively considered by using a distance and a relative velocity between the surrounding obstacle and the ego-vehicle, and a risk of a collision between vehicles is better identified, so as to solve a problem of mis-determining or missed determining caused by a determining method only based on a braking distance and a minimum braking time in a conventional technology. In addition, in the method provided in this application, not only a collision with a vehicle that comes from the front of the ego-vehicle can be avoided, but also a collision with a vehicle that comes from the rear, the side, and the like of the ego-vehicle can be avoided. In a conventional technical method, only a collision with a vehicle that comes from the front of the ego-vehicle can be avoided. By comparison, an obstacle avoidance capability of the intelligent vehicle is improved, not only the intelligent vehicle can be controlled to decelerate, but also the intelligent vehicle can be controlled to accelerate based on a determined obstacle avoidance direction, thereby enabling the intelligent vehicle to implement obstacle avoidance in each direction. In addition, in the method provided in this application, a more accurate obstacle avoidance direction and velocity are provided, which can ensure that the intelligent vehicle implements obstacle avoidance based on an optimal safe direction and velocity at a current moment, thereby avoiding a collision between the ego-vehicle and a surrounding vehicle.

According to a second aspect, this application provides another vehicle control method, where the method includes: calculating a collision potential energy of a surrounding obstacle of an intelligent vehicle based on first sensing data, where the first sensing data includes a relative velocity and a relative distance between the surrounding obstacle and the intelligent vehicle; determining, based on the collision potential energy of the surrounding obstacle, a safe velocity for the intelligent vehicle to travel in a first area, where the first area is an area on a planned path of the intelligent vehicle; and controlling the intelligent vehicle to travel at the safe velocity in the first area. In the foregoing method provided in this application, the safe velocity may be determined by using the collision potential energy of the surrounding obstacle, and the intelligent vehicle may be controlled by using the safe velocity to travel in the first area, thereby implementing an obstacle avoidance process of the intelligent vehicle, reducing damage to an in-vehicle person and the vehicle, and improving safety of the intelligent vehicle.

In a possible implementation, the collision potential energy is used to identify a trend of a collision between the surrounding obstacle and the intelligent vehicle.

In another possible implementation, the collision potential energy of the surrounding obstacle may be calculated by using the following formula:

$$f = k \cdot \frac{V^\alpha}{d^\beta} + C$$

where k, α, and β are constant coefficients, C is a constant, V is a magnitude of a relative velocity between a first obstacle and the intelligent vehicle, d is a relative distance between the first obstacle and the intelligent vehicle, and the first obstacle is any surrounding obstacle of the intelligent vehicle.

In another possible implementation, the method further includes: determining a collision risk level of each surrounding obstacle based on a collision potential energy of the surrounding obstacle and a preset threshold, where the collision risk level includes safe, warning, and dangerous; selecting all surrounding obstacles with a preset collision risk level; and determining the safe velocity based on collision potential energies of all the selected surrounding obstacles with the preset collision risk level. In this application, a controller may select some surrounding obstacles from all the surrounding obstacles based on the preset collision risk level, and further determine a safe velocity for obstacle avoidance based on a collision potential energy of each obstacle, thereby reducing a calculation amount and processing duration of the controller.

In another possible implementation, the method further includes: obtaining the first sensing data, where the first sensing data is data obtained after initial data detected by a sensing device of the intelligent vehicle is analyzed and processed; establishing a coordinate system that uses the intelligent vehicle as an origin; and calculating a location of the surrounding obstacle in the coordinate system based on the first sensing data, where the location is used to indicate coordinates and a quadrant of the obstacle in the coordinate system.

In another possible implementation, an ego-vehicle coordinate system of the intelligent vehicle may be a coordinate system that uses a center of mass of the ego-vehicle as an origin and uses a traveling direction as a positive direction of an X-axis. Optionally, the coordinate system may alternatively use a middle point of the head of the ego-vehicle or a middle point of the tail of the ego-vehicle as an origin.

In another possible implementation, the determining, based on the collision potential energy of the surrounding obstacle, a safe velocity for the intelligent vehicle to travel in a first area includes: when all the surrounding obstacles with the preset safety risk level are distributed in four quadrants, identifying a maximum safe angle in an obstacle-free area, using a direction of an angular bisector of the maximum safe angle as a direction of the safe velocity, and using a magnitude greater than or equal to a magnitude of a maximum velocity of the surrounding vehicles as a magnitude of the safe velocity.

In another possible implementation, the method further includes: when all the surrounding obstacles with the preset safety risk level are distributed in three quadrants, separately calculating a combination of collision potential energies of all obstacles with the preset safety risk level in a same quadrant; determining an orthogonal direction of a collision potential energy combination in each quadrant; removing a collision potential energy combination and/or an orthogonal direction of a collision potential energy combination of all obstacles in an obstacle-exist quadrant; and calculating a collision potential energy combination and/or an orthogonal direction of a collision potential energy combination in an obstacle-free quadrant, using a combination of all directions in the collision potential energy combination and/or the orthogonal direction of the collision potential energy combination in the obstacle-free quadrant as a direction of the safe velocity, and using a magnitude greater than or equal to a magnitude of a maximum velocity of the surrounding vehicles as a magnitude of the safe velocity. A direction of a combination of collision potential energy combinations in the two quadrants is the direction of the safe velocity, and a magnitude of the combination of the collision potential energy combinations in the two quadrants is the magnitude of the safe velocity; and the collision potential energy combination and/or the orthogonal direction of the collision potential energy combination includes any of the following two cases: the collision potential energy combination and the orthogonal direction of the collision potential energy combination, the collision potential energy combination, or the orthogonal direction of the collision potential energy combination.

In another possible implementation, the method further includes: when all the surrounding obstacles with the preset safety risk level are distributed in two adjacent quadrants, separately calculating a collision potential energy combination of all surrounding obstacles with the preset collision risk level in a same quadrant, and determining an orthogonal direction of each collision potential energy combination; removing an orthogonal direction in an obstacle-exist quadrant; and calculating a combination of orthogonal directions of collision potential energy combinations in an obstacle-free quadrant as a direction of the safe velocity, and using a magnitude greater than or equal to a magnitude of a maximum velocity of all the surrounding vehicles with the preset collision risk level as a magnitude of the safe velocity.

In another possible implementation, the method further includes: when all the surrounding obstacles with the preset safety risk level are distributed in two adjacent quadrants, calculating a collision potential energy combination of all surrounding vehicles with the preset collision risk level in a same quadrant, and determining an orthogonal direction of each collision potential energy combination; removing an orthogonal direction of a collision potential energy combination in an obstacle-exist quadrant; and comparing collision potential energy combinations in the two quadrants in an obstacle-free quadrant; and when the collision potential energy combinations in the two quadrants are equal, calculating a combination of the collision potential energy combinations in the two quadrants, and using the combination of the collision potential energy combinations in the two quadrants as the safe velocity; or when the collision potential energy combinations in the two quadrants are not equal, calculating a combination of orthogonal directions of the collision potential energy combinations in the two quadrants, and using the combination of the orthogonal directions of the collision potential energy combinations in the two quadrants as the safe velocity, where a magnitude of the orthogonal direction of the collision potential energy combination is a magnitude of the collision potential energy combination, and a direction of the orthogonal direction of the collision potential energy combination is a direction perpendicular to the collision potential energy combination.

In another possible implementation, the method further includes: when all the surrounding obstacles with the preset safety risk level are distributed in two non-adjacent quadrants, separately calculating a collision potential energy combination of all surrounding obstacles with the preset collision risk level in a same quadrant, and determining an orthogonal direction of each collision potential energy combination; and calculating a combination of orthogonal directions that are of collision potential energy combinations and that belong to a same quadrant, using any direction of the combination of the orthogonal directions that are of the collision potential energy combinations and that belong to the same quadrant as a magnitude of the safe velocity, and using a magnitude greater than or equal to a magnitude of a maximum velocity of the surrounding vehicles as a magnitude of the safe velocity.

In another possible implementation, the method further includes: when it is determined that all the surrounding vehicles with the preset collision risk level are distributed in only one quadrant, calculating a collision potential energy combination of all the surrounding vehicles with the preset collision risk level, using an orthogonal direction of the collision potential energy combination as a direction of the safe velocity, and using a magnitude greater than or equal to a magnitude of a maximum velocity of the surrounding vehicles as a magnitude of the safe velocity.

In another possible implementation, the method further includes: determining whether the direction of the safe velocity belongs to a travelable range, where the travelable range is an area that meets the following criteria: no collision with a dynamic obstacle, no collision with a static obstacle, and no violation of a traffic rule, where the dynamic obstacle includes a motor vehicle, a pedestrian, or an animal; the static obstacle includes an infrastructure such as a median strip, a guardrail, a roadbed, or a street lamp; and the traffic rule includes driving against the direction of traffic or running a red light; and when the direction of the safe velocity belongs to the travelable range, controlling the intelligent vehicle to travel at the safe velocity in the first area.

In another possible implementation, when a second velocity determined by a safe channel has a plurality of directions, a safest direction may be selected based on a risk degree of a collision with the obstacle as a direction of the second velocity, where the risk degree of a collision includes one or more factors such as a probability of a collision with the obstacle or a degree of damage of a collision, and the degree of damage of a collision may be calibrated based on a size, a relative velocity, and a relative distance of the obstacle. A larger obstacle, a faster relative velocity, and a shorter relative distance result in a higher degree of damage of a collision.

According to a third aspect, this application provides a vehicle control apparatus, where the apparatus includes modules configured to perform the vehicle control method in any one of the first aspect or the possible implementations of the first aspect.

According to a fourth aspect, this application provides a vehicle control apparatus, where the apparatus includes modules configured to perform the vehicle control method in any one of the second aspect or the possible implementations of the second aspect.

According to a fifth aspect, this application provides a vehicle control controller. The controller includes a processor, a memory, a communication interface, and a bus. The processor, the memory, and the communication interface are connected to and communicate with each other through the bus. The memory is configured to store computer-executable instructions. When the controller runs, the processor executes the computer-executable instructions in the memory to perform, by using hardware resources in the controller, the operation steps of the method according to any one of the first aspect or the possible implementations of the first aspect.

According to a sixth aspect, this application provides a vehicle control controller. The controller includes a processor, a memory, a communication interface, and a bus. The processor, the memory, and the communication interface are connected to and communicate with each other through the bus. The memory is configured to store computer-executable instructions. When the controller runs, the processor executes the computer-executable instructions in the memory to perform, by using hardware resources in the controller, the operation steps of the method according to any one of the second aspect or the possible implementations of the second aspect.

According to a seventh aspect, this application provides an intelligent vehicle, where the intelligent vehicle includes a controller, and the controller is configured to implement the functions implemented by the controller in the fifth aspect and any possible implementation of the fifth aspect, or the controller is configured to implement the functions implemented by the controller in the sixth aspect and any possible implementation of the sixth aspect.

According to an eighth aspect, this application provides a computer-readable storage medium. The computer-readable storage medium stores instructions. When the instructions are run on a computer, the computer is enabled to perform the method or function according to the foregoing aspects.

According to a ninth aspect, this application provides a computer program product including instructions. When the computer program product runs on a computer, the computer is enabled to perform the method or function according to the foregoing aspects.

Based on the implementations provided in the foregoing aspects, this application may provide more implementations through further combination.

DESCRIPTION OF EMBODIMENTS

The following clearly describes the technical solutions in the embodiments of this application with reference to the accompanying drawings in the embodiments of this application.

Figure 1:
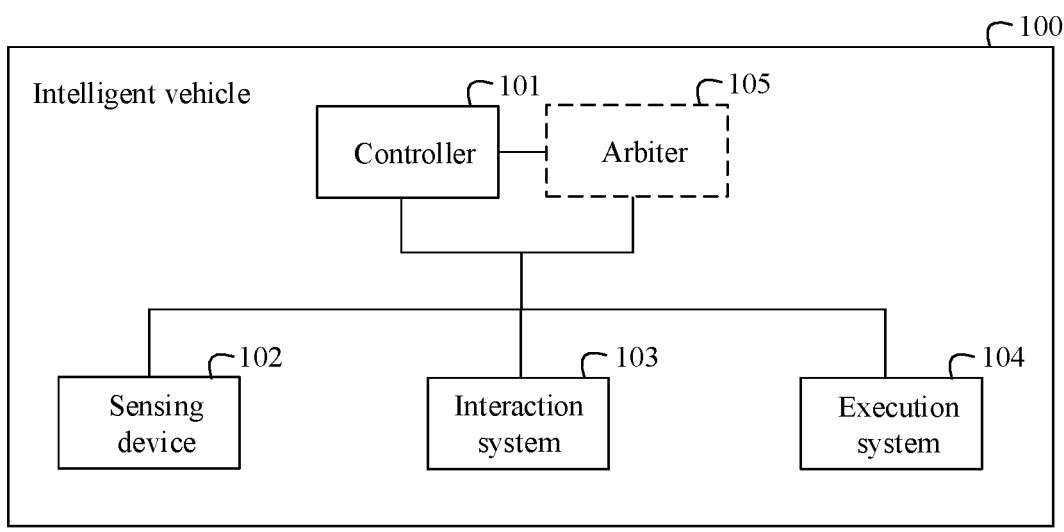
FIG. 1 is a schematic architectural diagram of an intelligent vehicle according to this application.

FIG. 1 is a schematic architectural diagram of an intelligent vehicle according to this application. As shown in the figure, an intelligent vehicle 100 includes a controller 101, a sensing device 102, an interaction system 103, and an execution system 104. The sensing device 102 is configured to obtain information about an obstacle such as a vehicle, a person, and an infrastructure around the intelligent vehicle by using a sensor, including an image of the obstacle and detection information. The detection information may vary with a type of the sensing device. For example, when the sensing device is a laser radar, the laser radar may transmit a detection signal (for example, a laser beam) to a target. Then, a received signal reflected back from the target (for example, a target echo) is compared with the transmitted signal, and after proper processing is performed, related detection information about the target can be obtained, for example, parameters such as a target distance, an orientation, a height, a velocity, a gesture, and even a shape. The information about the obstacle is sent to the controller 101. The controller 101 further determines a traveling track for the intelligent vehicle to a destination based on the information about the obstacle, and then sends a control instruction including a velocity to the execution system 104, so that the execution system 104 controls the intelligent vehicle to travel. The execution system 104 may include a brake controller 1041, a steering controller 1042, and a throttle controller 1043. The velocity is a vector including a magnitude and a direction, and the magnitude of the velocity may also be referred to as a rate. To meet functional safety requirements for safe traveling of the intelligent vehicle, the controller 101 may respectively calculate traveling velocities in a same area by using a redundant design of dual channels.

Specifically, the controller may include a working channel and a safe channel. The working channel is used to plan a traveling velocity of the intelligent vehicle by using an artificial intelligence algorithm. The safe channel defines a potential function between the intelligent vehicle and the obstacle, and plans an obstacle avoidance velocity of the intelligent vehicle based on a potential energy decomposition and combination method, thereby preventing a collision. The controller 101 may respectively determine traveling velocities in a same area in the traveling track by using the working channel and the safe channel, and then the controller 101 determines, based on a preset condition, a final velocity that needs to be selected. The final velocity selected by the controller 101 may also be referred to as an optimal velocity, and the potential energy decomposition and combination method may also be referred to as a vector decomposition and combination method.

It should be noted that in the following embodiments of this application, the "velocity" means including both a magnitude and a direction unless otherwise specified.

FIG. 1 further includes the interaction system 103. The interaction system 103 is configured to implement message interaction between the intelligent vehicle 100 and a driver, so that the driver can send an operation instruction to the intelligent vehicle by using the interaction system 103, and learn of a current status of the intelligent vehicle by using the interaction system 103.

In a possible embodiment, the controller 101 selects, based on the preset condition, the velocity determined by the working channel or the safe channel as the optimal velocity for the intelligent vehicle to travel. In addition, the intelligent vehicle 100 further includes an arbiter 105, and the arbiter 105 separately receives the velocity planned by the working channel 1011 and the velocity planned by the safe channel 1012, and the arbiter 105 selects the optimal velocity based on the preset condition for the intelligent vehicle to travel.

Figure 2:
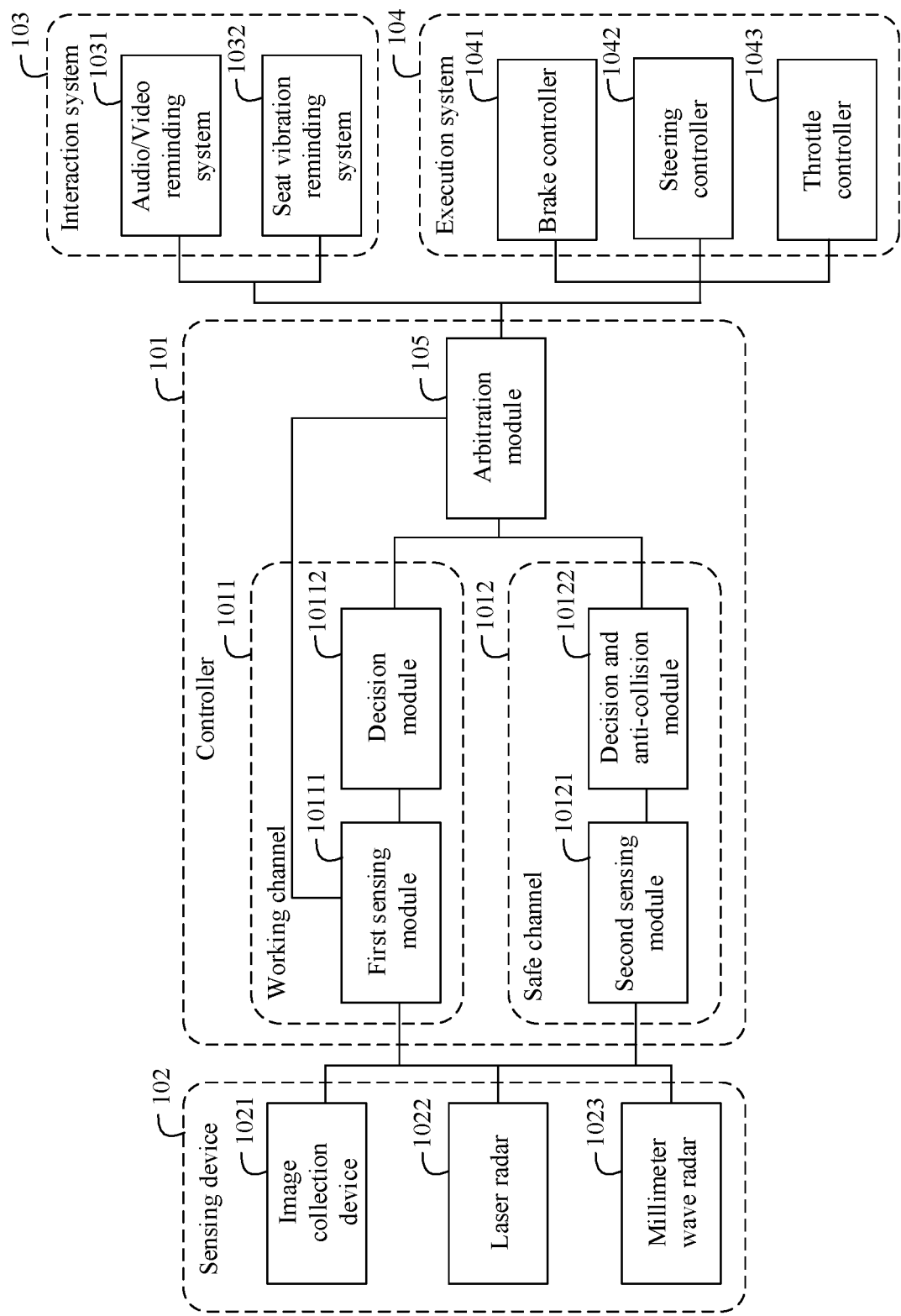
FIG. 2 is a schematic architectural diagram of another intelligent vehicle according to this application.

FIG. 2 is a schematic architectural diagram of another intelligent vehicle according to this application. As shown in the figure, FIG. 2 further shows a logical structure of each part of the intelligent vehicle 100 in FIG. 1. The sensing device 102 includes one or more of sensors that have a capability of detecting and identifying a surrounding object, such as an image collection device 1021, a laser radar 1022, and a millimeter wave radar 1023. In addition, a quantity of same sensors deployed in a same intelligent vehicle does not constitute a limitation on the technical solution protected in this application.

The controller 101 includes a redundant design of dual channels: the working channel 1011 and the safe channel 1012. The working channel 1011 is used to perform sensing, decision-making, and path planning by using an artificial intelligence algorithm, and output a safe direction and a safe velocity of the intelligent vehicle, so that the intelligent vehicle can meet a quality management (QM) requirement. The working channel 1011 includes a first sensing module 10111 and a decision module 10112. The first sensing module 10111 is configured to: collect the information about the surrounding obstacle of the intelligent vehicle that is collected by the sensing device, and process the information about the obstacle to obtain road condition information, such as a type, a velocity, and a size of the obstacle, and a condition of an infrastructure such as a road (for example, a lane quantity or a traffic sign in a current direction). The decision module 10112 is configured to further determine a traveling direction and a traveling velocity in an area based on the road condition information provided by the first sensing module 10111. The safe channel 1012 includes a second sensing module 10121 and a decision and anti-collision module 10122. The decision and anti-collision module 10122 is configured to: further determine a traveling direction and a traveling velocity in an area by using the potential energy decomposition and combination method based on information about an obstacle that is provided by the second sensing module 10112, such as a relative distance and a relative velocity between the obstacle and the ego-vehicle, so that traveling of the intelligent vehicle can meet requirements of safe levels and automotive safety integrity level (ASIL) D. The ASIL level is short for automotive safety integrity level, and is used to describe a probability that a component or a system implements a specified safety target. The ASIL level is determined by three basic elements, that is, severity (S), exposure (E), and controllability (controllability, C). Severity: is used to indicate severity of damage to the life and property of a person in a vehicle once a risk occurs. Exposure: is used to indicate a probability of damage to a person or property. Controllability: is used to describe an extent to which a driver can take proactive measures to avoid damage when a risk becomes a reality. ASIL levels can be divided into four levels: D, C, B, and A. The level D has the lowest safety risk, and the level A has the highest safety risk. In addition to the four safe levels, there is a quality management requirement. The quality management requirement involves no safety requirement. For an automated driving mode, a safety risk of the quality management requirement is higher than that of the ASIL.

In a possible implementation, the first sensing module 10111 and the second sensing module 10112 in FIG. 2 may be combined into one sensing module. The combined sensing module obtains the information about the obstacle from the sensing device 102, further calculates road condition information such as the relative distance between the obstacle and the intelligent vehicle and the relative velocity between the obstacle and the intelligent vehicle based on the information, and separately sends required content to the decision module 10112 and the decision and anti-collision module 10122 based on information required by the decision module 10112 and the decision and anti-collision module 10122.

In the controller shown in FIG. 2, the first sensing module 10111, the decision module 10112, the second sensing module 10121, the decision and anti-collision module 10122, and an arbitration module 105 may be implemented by hardware, or may be implemented by software, or a corresponding function is implemented by hardware and software together.

In a possible implementation, FIG. 1 and FIG. 2 are merely schematic architectural diagrams of an intelligent vehicle according to this application, and a function of the arbiter may be implemented by software or hardware in the controller. The arbiter may alternatively be used to implement redundant channel selection by using an independent processor. For ease of description, the following description of this application uses an example in which the arbiter is a module in the controller as an example for description. In addition, for ease of describing an anti-collision method provided in this application, in the following embodiments, an example in which the surrounding obstacle is a surrounding vehicle is used for description.

Figure 3A:
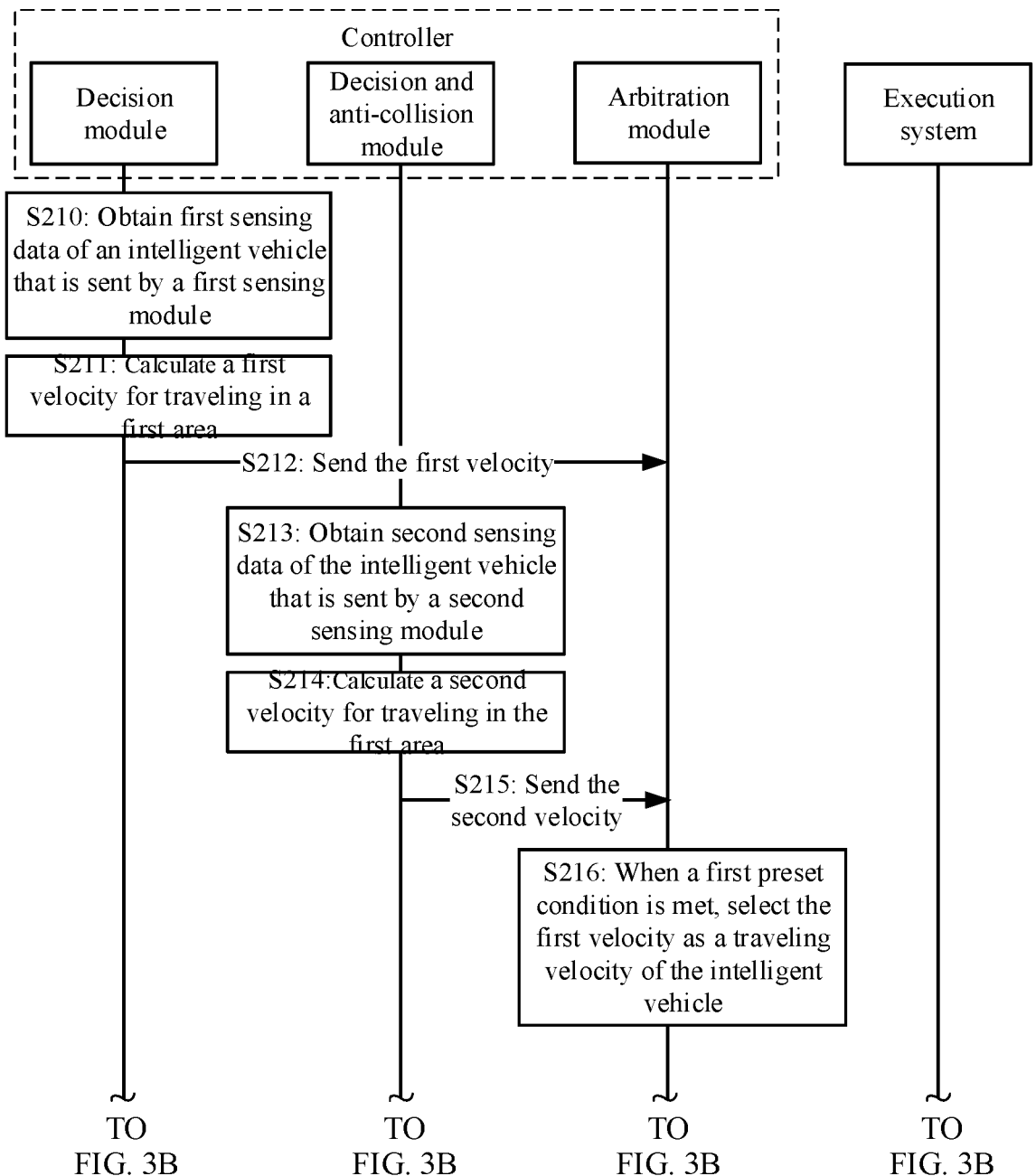
FIG. 3A and FIG. 3B are a schematic flowchart of a PLC control method according to this application.
Figure 3B:
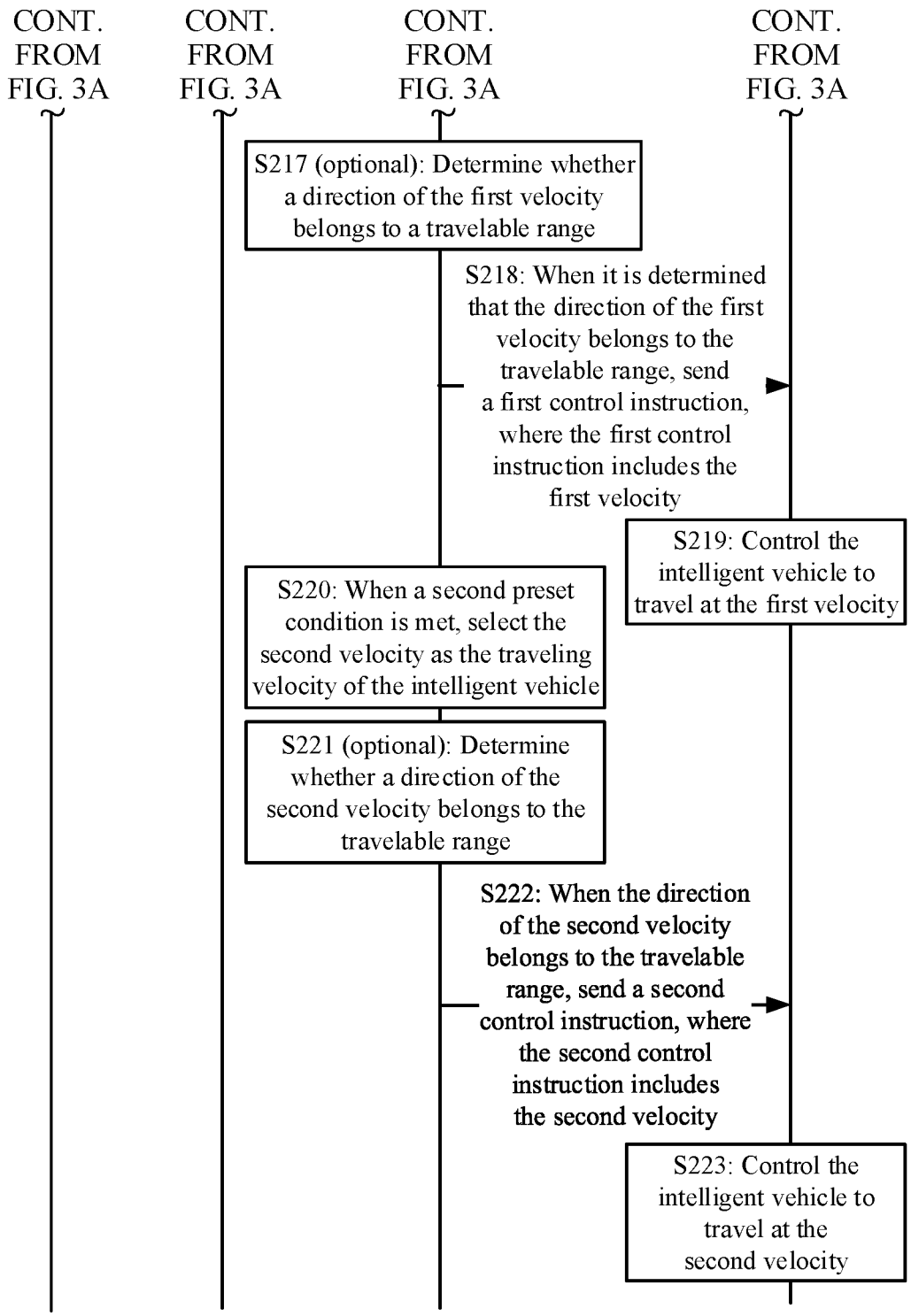

FIG. 3A and FIG. 3B are a schematic flowchart of a vehicle control method according to this application. The method is performed by the decision module 10112, the decision and anti-collision module 10122, and the arbitration module 105 that are in the controller 101 of the intelligent vehicle in FIG. 2, and the control system 104 of the intelligent vehicle. As shown in the figure, the method includes the following steps.

S210: The decision module obtains first sensing data of the intelligent vehicle that is learned by a first sensing module.

The first sensing module may obtain, by using a sensing device, information about a surrounding vehicle of the intelligent vehicle, such as a type, a status, a velocity, and a size that are of an obstacle, and a road sign. For example, when the sensing device includes an image collection device, information about the surrounding obstacle may be obtained by collecting an image, and the first sensing module may analyze the type and the size that are of the obstacle, the road sign, and the like based on the image. When the sensing device is a laser radar, a light beam returns to the laser radar through diffuse reflection after touching an object. The first sensing module may multiply a time interval between signal sending and receiving of the laser radar by a velocity of light, and divide the product by 2 to calculate a distance between the laser radar and the object. A movement distance of the obstacle relative to the intelligent vehicle may be learned by using two or more beams of light, and a relative velocity between the obstacle and the intelligent vehicle may be further calculated in combination with time of transmitting the two beams of light. The first sensing module may send the relative distance between the obstacle and the intelligent vehicle and the relative velocity between the obstacle and the intelligent vehicle to the decision module as the first sensing data.

S211: The decision module calculates a first velocity for traveling in a first area.

During traveling, the intelligent vehicle plans an entire path to a destination based on the destination, a driver's driving habit, and a map. However, because a road condition in a traveling process is complex, the decision module further needs to plan a traveling track of the intelligent vehicle based on a road condition of a traveling area at a current moment. For example, the decision module learns a road condition of an area in the entire planned path in real time or periodically based on the first sensing data. For ease of description, the following embodiment of this application is described by using an example that the area is the first area. A length of the first area is determined by a range of an obstacle that can be detected by the sensing device and a calculation capability of the decision module in the intelligent vehicle.

The decision module may determine a location of the obstacle and the relative velocity between the obstacle and the intelligent vehicle based on the first sensing data, and determine a traveling direction and a traveling velocity of the intelligent vehicle based on a target vehicle velocity of the intelligent vehicle. A direction and a velocity that are determined by a working channel in the controller may be referred to as a first velocity, or may be referred to as a working velocity. For ease of description, the following embodiment is described by using an example that the first velocity includes a direction and a velocity that are determined by the decision module in the working channel.

For example, the decision module may plan the first velocity of the intelligent vehicle in the first area based on a destination specified by the driver, an in-vehicle map, a positioning system, and the information about the surrounding obstacle. This application sets no limitation on a method for determining the first velocity by the decision module. In specific implementation, the first velocity may be determined based on a service requirement by using a proper method.

S212: The decision module sends the first velocity to the arbitration module.

S213: The decision and anti-collision module obtains second sensing data of the intelligent vehicle that is sent by a second sensing module.

The decision and anti-collision module may also obtain the second sensing data from the second sensing module by using a method similar to that in step S210. The second sensing data includes a relative distance, a relative velocity, and a relative location between a surrounding vehicle and an ego-vehicle, and the relative location may be calculated based on an angle of a light beam received by the sensing device and the relative distance. For example, an angle of a light beam received by the sensing device from the obstacle is 30 degrees, and the decision and anti-collision module may determine a location of the obstacle in an ego-vehicle coordinate system based on the angle and the relative distance.

S214: The decision and anti-collision module calculates a second velocity for the intelligent vehicle to travel in the first area.

The decision and anti-collision module may search for an obstacle avoidance velocity of the intelligent vehicle based on a potential energy decomposition and combination method. A velocity determined by a safe channel in the controller may be referred to as the second velocity, or may be referred to as a safe velocity. For ease of description, the following embodiment is described by using an example that the second velocity is a velocity determined by the decision module in the working channel.

Figure 4A:
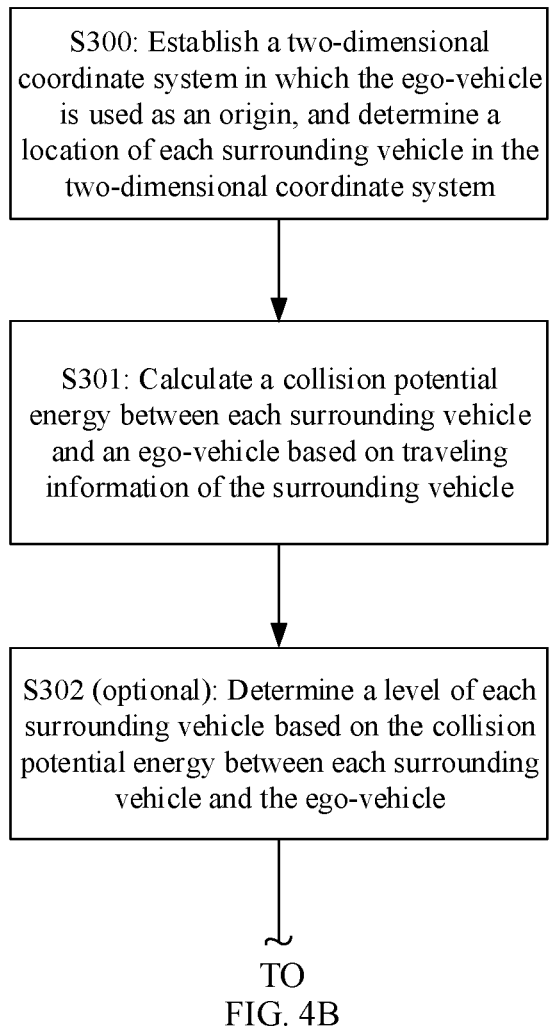
FIG. 4A to FIG. 4C are a schematic flowchart of another PLC control method according to this application.
Figure 4B:
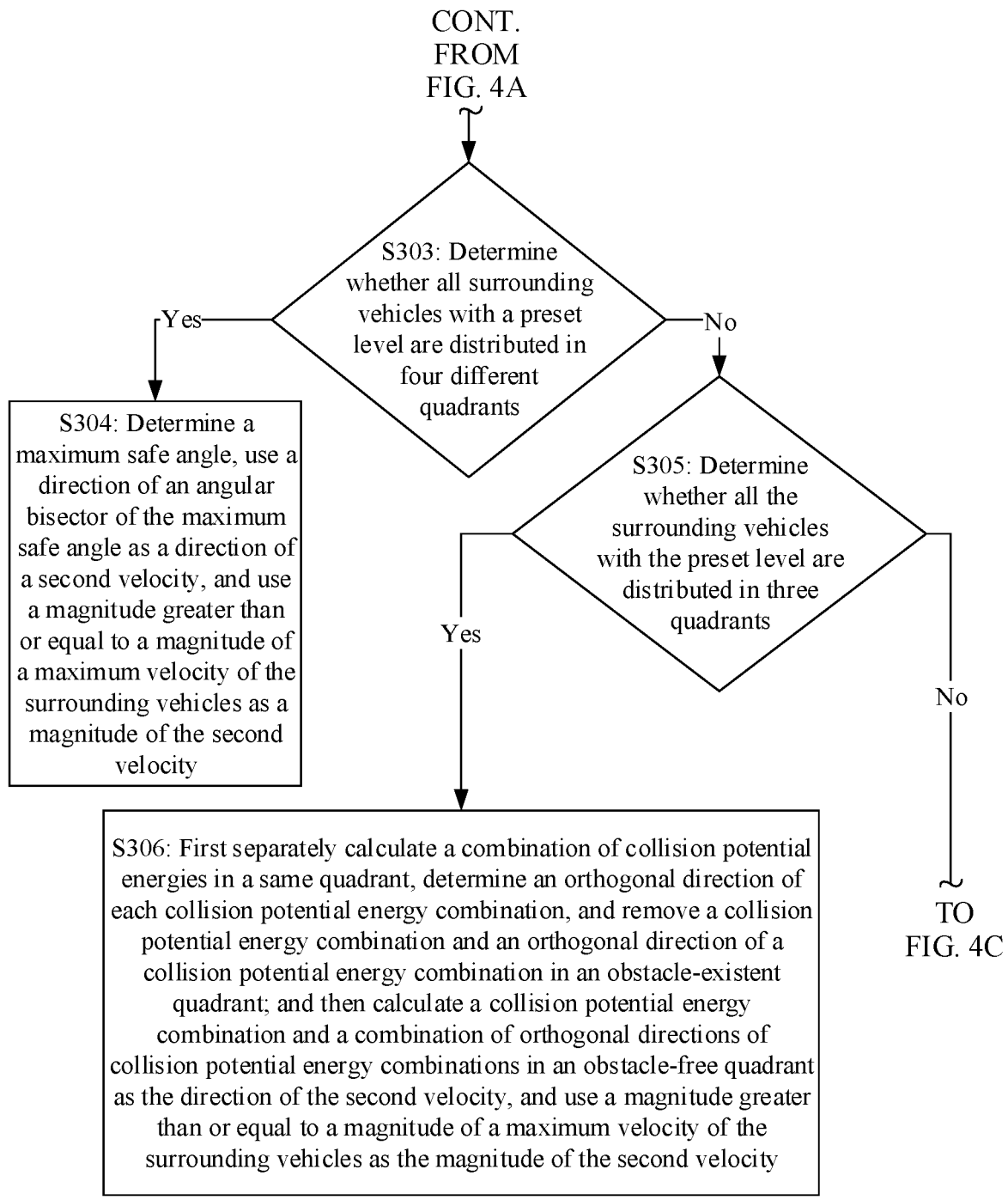
Figure 4C:
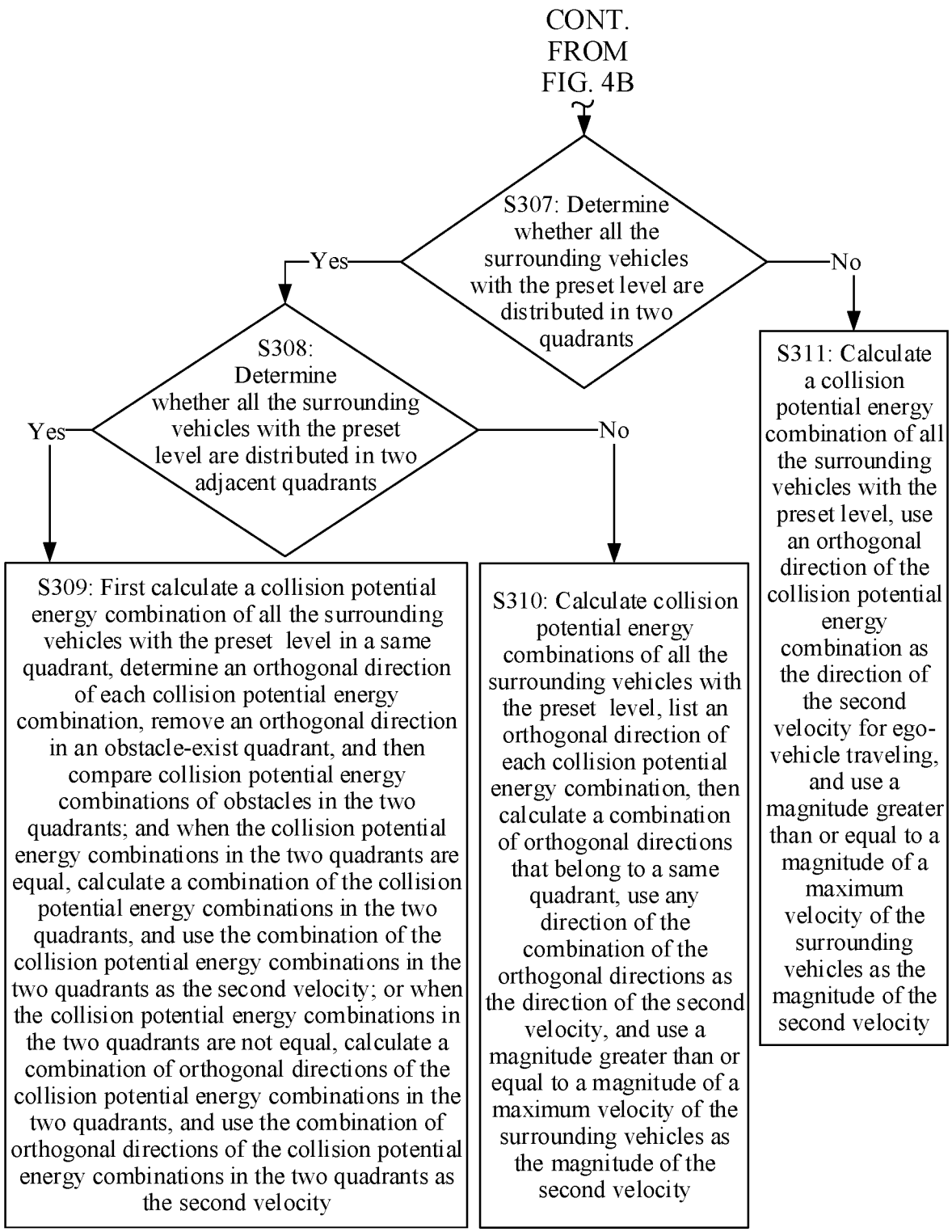

FIG. 4A to FIG. 4C are a schematic flowchart of another vehicle control method according to this application. The figure is specifically a schematic flowchart of a method for planning, by the decision and anti-collision module, the second velocity for the intelligent vehicle to travel in the first area. As shown in the figure, the method includes the following steps:

S300: Establish a two-dimensional coordinate system in which a center of mass of the intelligent vehicle is used as an origin and a direction of a traveling velocity of the intelligent vehicle is a positive direction of an X-axis, and determine a location of each surrounding vehicle in the two-dimensional coordinate system.

Optionally, the ego-vehicle coordinate system may alternatively be a coordinate system in which a non-center of mass is used as an origin, for example, a central location in front of the ego-vehicle is used as the origin, or a middle point of a central axis of the ego-vehicle is used as the origin.

Optionally, the ego-vehicle coordinate system may alternatively be a three-dimensional coordinate system. A coordinate of each obstacle on a Z-axis in the ego-vehicle coordinate system may be any value, or a value obtained by converting a coordinate in a coordinate system in which another vehicle is located into that in the ego-vehicle coordinate system.

Optionally, in addition to using the direction of the velocity as the positive direction of the X-axis of the ego-vehicle coordinate system, the positive direction of the X axis may be set in another manner. For example, a heading direction of the head of the ego-vehicle is used as the positive direction of the X axis.

S301: The decision and anti-collision module calculates a collision potential energy between each surrounding vehicle and the intelligent vehicle based on a relative distance and a relative velocity between the surrounding vehicle and the ego-vehicle.

Figure 5:
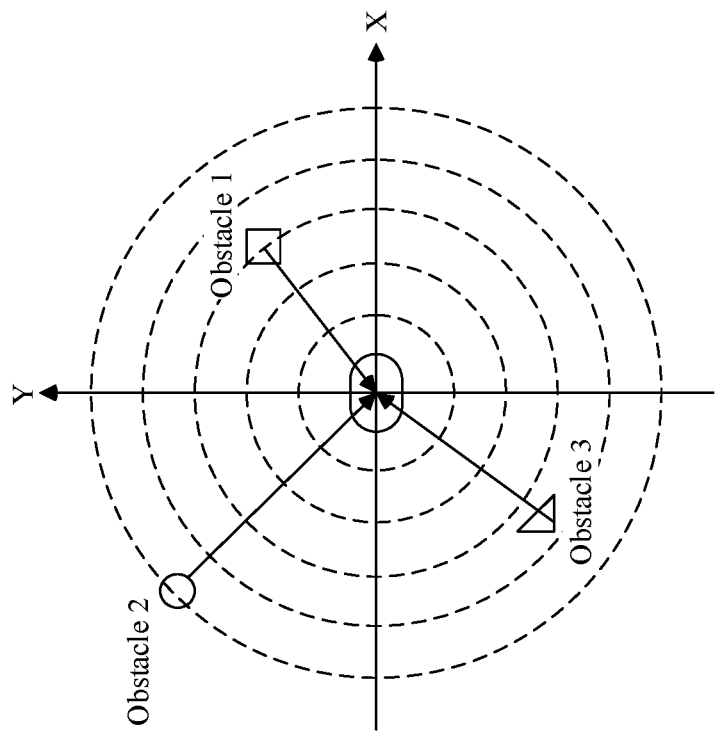
FIG. 5 is a schematic diagram of an intelligent vehicle coordinate system according to this application.
Figure 5:
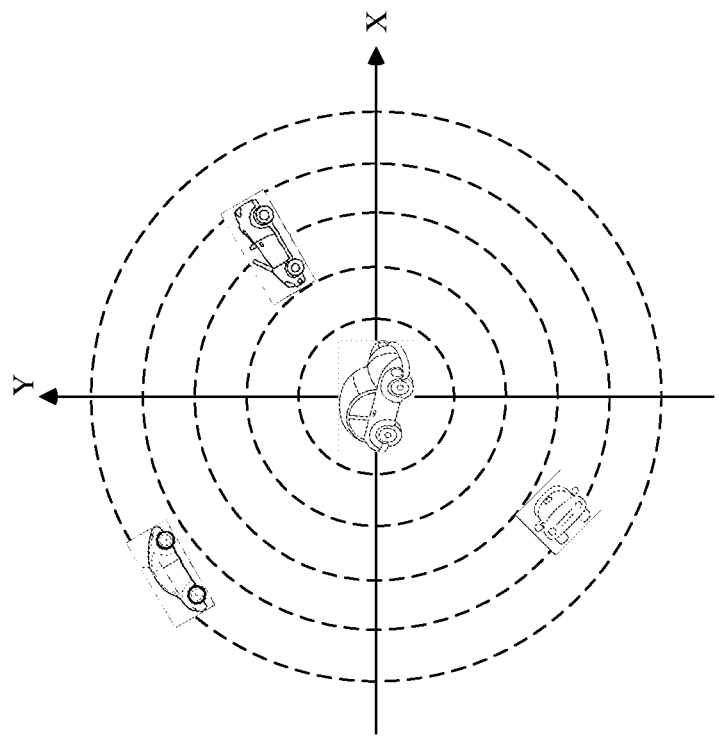

FIG. 5 is a schematic diagram of an intelligent vehicle coordinate system according to this application. As shown in FIG. 5, a two-dimensional coordinate system is established by using a center of mass of an intelligent vehicle as an origin, and a direction of a traveling velocity of the intelligent vehicle as a positive direction of an X-axis. The center of mass of the intelligent vehicle may be a center of a cube based on a length, a width, and a height of the ego-vehicle.

A specific process of using the sensing device to determine a relative distance and a relative velocity between the vehicle and an obstacle is as follows:

1: Measure a location O of the obstacle at a moment T, and measure a location O' of the obstacle at a moment T'.

2: Calculate a current distance $d=\overline{|O'|}$ between the ego-vehicle and the obstacle.

3: Calculate the relative velocity between the ego-vehicle and the obstacle, where a direction of the velocity points to the intelligent vehicle.

Figure 6:
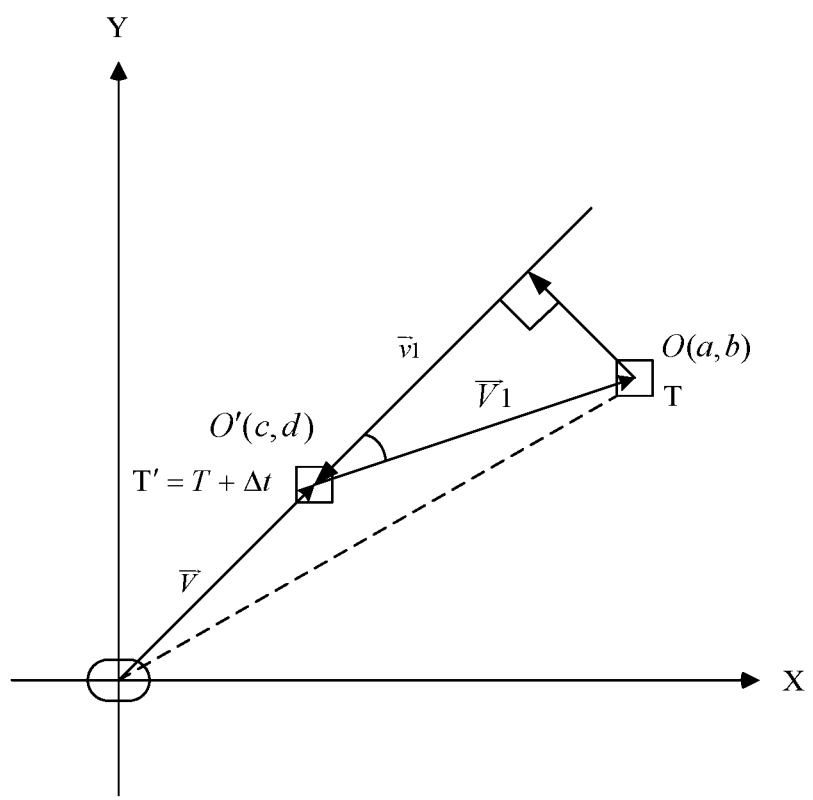
FIG. 6 is a schematic diagram of a method for calculating a relative velocity between an obstacle and an ego-vehicle according to this application.

FIG. 6 is a schematic diagram of a method for calculating a relative velocity between an obstacle and an ego-vehicle according to this application. As shown in the figure, the obstacle moves from $\vec{O}$ to $\vec{O}$ to starting from a moment T to a moment T'=T+Δt, where $\vec{O}=(a,b)$, $\vec{O}'=(c,d)$, a velocity of the ego-vehicle is $\vec{V}$, a velocity of the obstacle is $\vec{V}1$, and a projection of the velocity of the obstacle in a direction of the velocity of the ego-vehicle is $\vec{v}1$.

First, a distance that the obstacle itself moves within time z is calculated by using formula (1):

$$s = \overline{|OO'|} = |\vec{O} - \vec{O}'| \quad \text{Formula (1)}$$

Then, the velocity is calculated by using formula (2):

$$\vec{V1} = \frac{ds}{dt} = \left(\frac{\partial \overline{Sx}}{\partial t}, \frac{\partial \overline{Sy}}{\partial t}\right) \quad \text{Formula (2)}$$

Then, the projection of the obstacle in the direction of the velocity of the intelligent vehicle is calculated by using formula (3):

$$\vec{v1} = \vec{V1} \cdot Proj(\vec{O'}) = \frac{\vec{V_1} \cdot \vec{O'}}{|\vec{O'}|} \quad \text{Formula (3)}$$

where $\vec{O}$ identifies coordinates of a vector of a movement location of the obstacle at the moment T'=T+Δt in an intelligent vehicle coordinate system. For example, $\vec{O}=(c,d)$ shown in FIG. 6, and $\overline{|O'|}$ is a length of $\vec{O}$ and may be specifically calculated by using $|\vec{O'}|=\sqrt{c^2+d^2}$.

Only when the obstacle is in a same direction as the ego-vehicle and a magnitude of the velocity of the obstacle is close to that of the velocity of the ego-vehicle, the obstacle may collide with the ego-vehicle. The projection of the obstacle in the direction of the velocity of the intelligent vehicle is calculated, that is, a velocity component of the obstacle that may collide with the ego-vehicle is determined. In other words, the projection of the obstacle in the direction of the velocity of the intelligent vehicle is used to indicate a trend of a collision with the ego-vehicle when the obstacle moves in the direction of the traveling velocity of the ego-vehicle. The projection of the obstacle in the direction of the velocity of the intelligent vehicle is used as the relative velocity between the obstacle and the intelligent vehicle.

4: Calculate a collision potential energy of the obstacle by using formula (4):

$$f(O) = k \cdot \frac{v_o^\alpha}{d_o^\beta} + C \quad \text{Formula (4)}$$

A collision potential energy f(O) of an obstacle O is used to describe a trend that the obstacle O may collide with the intelligent vehicle, or is referred to as an escape potential energy required by the intelligent vehicle to avoid a collision with the obstacle. For example, when the ego-vehicle is closer to the obstacle, an escape trend of the ego-vehicle is stronger, and when the obstacle approaches faster, the escape trend of the ego-vehicle is stronger. In the foregoing formula, k, α, and β are constant coefficients, C is a constant, and a value of C may be flexibly set based on a simulation result and actual experience. The velocity V is the relative velocity between the obstacle and the intelligent vehicle, and is a vector having both a magnitude and a direction. Therefore, f is also a vector whose direction is the same as the direction of v. It should be noted that when the magnitude of f(O) is calculated, a magnitude of v is substituted into the foregoing formula to obtain the collision potential energy of the obstacle. Projections of f in x and y directions are respectively $$|f_x| = k \cdot \frac{|v_x|^\alpha}{d^\beta} \text{ and } |f_y| = k \cdot \frac{|v_y|^\alpha}{d^\beta},$$

where $v_x$ and $v_y$ are coordinates of V on an X-axis and a Y-axis, respectively.

Optionally, the collision potential energy of the obstacle may alternatively be calculated by using formula (5) or formula (6):

$$f(O) = k \cdot \frac{v_o^\alpha + c1}{d_o^\beta + c2} + C \qquad \text{Formula (5)}$$

$$f(O) = f_1(v) + f_2(d) + C \qquad \text{Formula (6)}$$

Further, the decision and anti-collision module may determine a location of each surrounding vehicle in the coordinate system shown in FIG. 5 based on a relative location between the surrounding vehicle and the ego-vehicle. Specifically, after a coordinate system that uses the ego-vehicle as an origin is established, the coordinate system is a two-dimensional coordinate system. In a plane of the two-dimensional coordinate system, a projection location of the surrounding vehicle in the two-dimensional coordinate system is used as the location of the surrounding vehicle. Optionally, a method for determining the location of the surrounding vehicle in the coordinate system of the ego-vehicle further includes: converting coordinates of the surrounding vehicle in a geodetic coordinate system into those of the two-dimensional coordinate system. In specific implementation, coordinate conversion of the surrounding vehicle between the two coordinate systems may be implemented by using a conventional technology, which is not limited in this application.

S302 (optional): Determine a collision risk level of each surrounding vehicle based on the collision potential energy of the surrounding vehicle.

Figure 7:
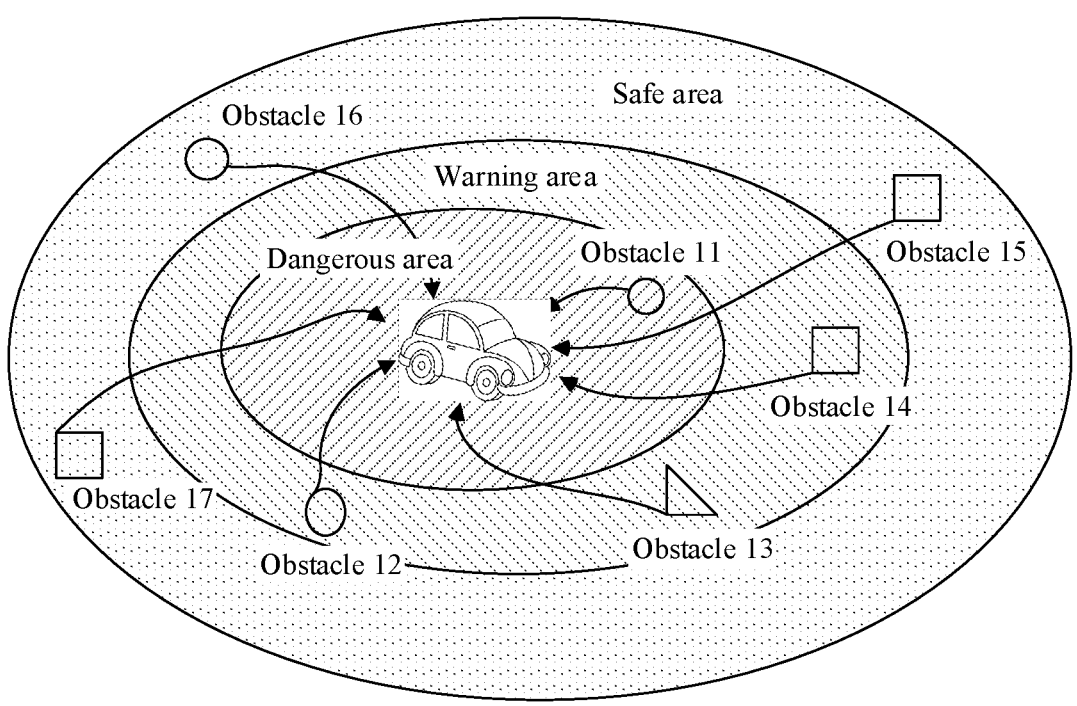
FIG. 7 is a schematic diagram of collision risk level classification of an obstacle according to this application.

Collision potential energies of all obstacles detected by the sensing device may be calculated by using any one of the foregoing formulas (4) to (6). However, to save a calculation capability of the decision and anti-collision module and increase a processing speed, obstacles with a relatively high potential collision risk may be found based on a preset condition, and further the second velocity is determined based on collision potential energies of these obstacles. For example, as shown in FIG. 7, in this application, risks of a collision between a surrounding vehicle and an ego-vehicle are classified into three levels: safe, warning, and dangerous. When an obstacle is at the safe level, there is no possibility of a collision with the vehicle. When an obstacle is at the warning level, there is a possibility of a collision with the vehicle, and the controller may remind the driver by using an interaction system to manually operate the vehicle, so as to implement obstacle avoidance. When an obstacle is at the dangerous level, the controller may take over control of the intelligent vehicle in an emergency situation, so as to avoid a collision between the ego-vehicle and another vehicle in an emergency situation occurring when another module of the intelligent vehicle performs processing.

It should be noted that when an obstacle is at the dangerous level, a case in which the controller actively takes over control of the vehicle is limited to a process in which another module performs calculation or data processing when the intelligent vehicle is in an automated driving mode. For a manual driving mode, an operation of the intelligent vehicle is completely controlled by the driver, and the controller does not interfere with a traveling process of the intelligent vehicle.

Optionally, collision risk levels may alternatively not be differentiated in the method provided in this application, and the second velocity is directly determined based on collision potential energies of all surrounding obstacles of the intelligent vehicle. For ease of description, the following embodiment of this application is described by using an example that collision risk levels of obstacles are classified.

The collision risk levels shown in FIG. 7 each may be preset with collision potential energies $|F_1|$ and $|F_2|$ based on an obstacle avoidance capability (such as performance and a size) of the intelligent vehicle. When $|F_2| \leq |f| < |F_1|$ an obstacle belongs to the warning level. When $|f| \geq |F_1|$, an obstacle belongs to the dangerous level. When $|f| < |F_2|$, an obstacle belongs to the safe level, where $|F_2| < |F_1|$.

Optionally, the decision and anti-collision module may determine a risk of a collision between a surrounding vehicle only at the warning and/or dangerous level and the ego-vehicle based on a collision potential energy of the surrounding vehicle. The decision and anti-collision module may alternatively calculate collision potential energies of all obstacles at the same time, and determine a risk of a collision between another surrounding vehicle and the ego-vehicle based on all the collision potential energies.

After the decision and anti-collision module calculates potential energies of obstacles and determines a quadrant to which each obstacle belongs in the intelligent vehicle coordinate system, the decision and anti-collision module preferably determines whether surrounding vehicles with a preset collision risk level are distributed in four quadrants. Then, the decision and anti-collision module determines level-by-level whether the surrounding vehicles with the preset collision risk level are distributed in three quadrants, two quadrants, and one quadrant. That is, the decision and anti-collision module determines, level-by-level in descending order of risks of a collision with the ego-vehicle, quadrants in which the surrounding vehicles with the preset collision risk level are distributed. Optionally, the decision and anti-collision module may alternatively directly determine quadrants in which all obstacles are distributed, and separately determine the second velocity by using different methods based on different quadrants in which all the obstacles are distributed. That is, the decision and anti-collision module may not determine, level-by-level based on collision risk levels of a collision between obstacles and the ego-vehicle, quadrants in which the obstacles are distributed, but directly considers the quadrants in which the obstacles are distributed; and separately determines the second velocity by using different methods in combination with various cases.

For ease of description, next, with reference to step S303 to step S311, an anti-collision method for determining the second velocity based on the collision risk level by the decision and anti-collision module is further described.

S303: Determine whether all surrounding vehicles with the preset collision risk level are distributed in four different quadrants.

S304: When all the surrounding vehicles with the preset collision risk level are distributed in four different quadrants, identify a maximum safe angle, use an angular bisector direction of the maximum safe angle as a direction of the second velocity, and use a magnitude greater than or equal to a magnitude of a maximum velocity of the surrounding vehicles as a magnitude of the second velocity.

Figure 8:
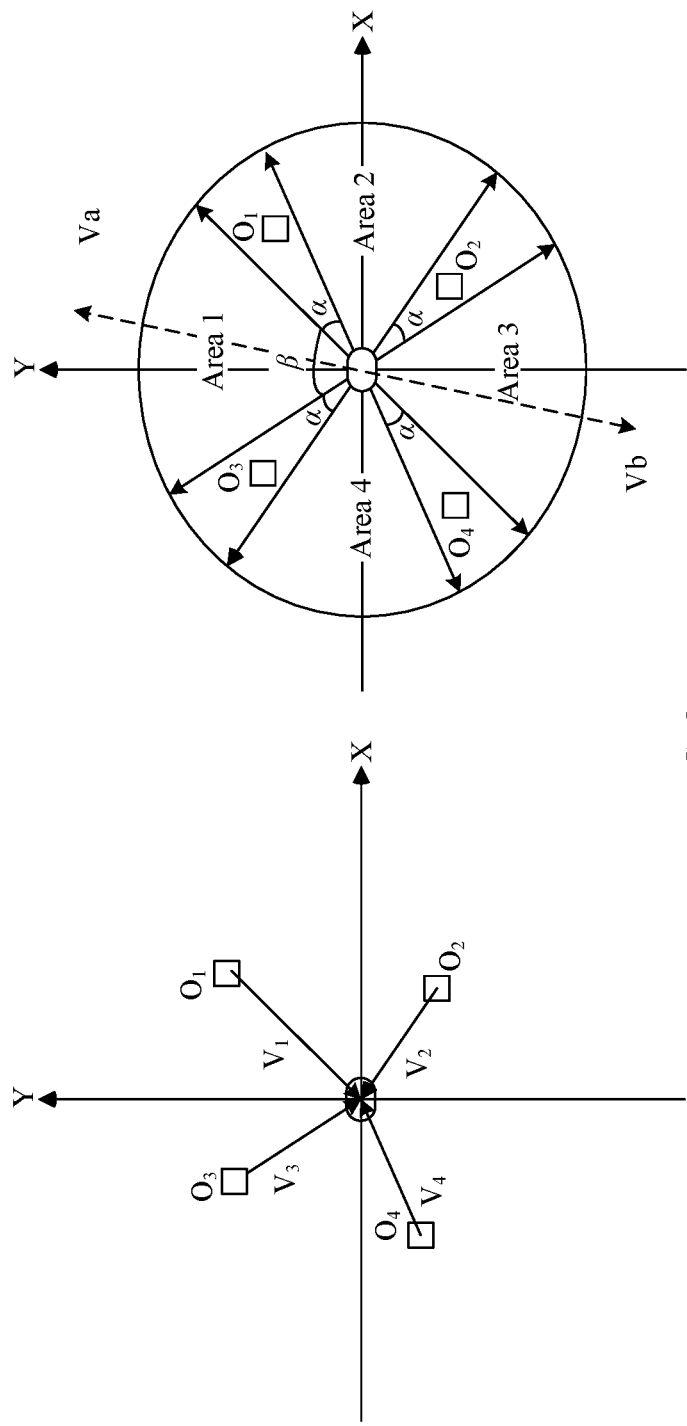
FIG. 8 is a schematic diagram of obstacle distribution in four quadrants according to this application.

As shown in FIG. 8, when all the surrounding vehicles with the preset collision risk level are distributed in four quadrants, theoretically, there is a risk that an obstacle collides with an ego-vehicle in each direction. The decision and anti-collision module may first determine, based on a preset angle α and a preset radius $\mathfrak{R}$, an arc area with an origin as a center and α as an included angle, as an assumed traveling range of a surrounding vehicle, and $\mathfrak{R}$ is a maximum traveling distance within a unit time and determined based on performance of each vehicle. Boundaries of traveling areas of two adjacent obstacles form anew area. As shown in the figure, when each quadrant in the four quadrants includes one surrounding vehicle, and four assumed vehicle traveling ranges are divided based on the preset angle and the preset radius, four areas are further divided, including an area 1, an area 2, an area 3, and an area 4, where the four areas are obstacle-free safe areas. The decision and anti-collision module may select an area with a largest included angle, use an angle bisector direction of the largest included angle as the direction of the second velocity of the intelligent vehicle for obstacle avoidance, and use a magnitude greater than or equal to a magnitude of a maximum velocity of the surrounding vehicles as the magnitude of the second velocity. For example, in FIG. 8, it is assumed that an included angle β of the area 1 is the largest included angle in the four areas, an angle bisector direction of the included angle is used as the direction of the second velocity, and a magnitude greater than or equal to a magnitude of a maximum velocity of the obstacle 1, the obstacle 2, the obstacle 3, and the obstacle 4 is used as the magnitude of the second velocity. The preset angle and the preset radius may be preset based on models, sizes, and performance of different surrounding vehicles, and the decision and anti-collision module may obtain an assumed traveling range of a surrounding vehicle based on the preset rule.

S305: When all the surrounding vehicles with the preset collision risk level are not distributed in four different quadrants, determine whether all the surrounding vehicles with the preset collision risk level are distributed in three different quadrants.

S306: When all the surrounding vehicles with the preset collision risk level are distributed in three different quadrants, first separately calculate a combination of collision potential energies in a same quadrant, determine an orthogonal direction of each collision potential energy combination, remove a collision potential energy combination or an orthogonal direction of a collision potential energy combination of all obstacles in an obstacle-existent quadrant, and then calculate a collision potential energy combination and/or an orthogonal direction of a collision potential energy combination in an obstacle-free quadrant, where a combination of all directions is the direction of the second velocity, and a magnitude greater than or equal to a magnitude of a maximum velocity of the surrounding vehicles is the magnitude of the second velocity. When only one obstacle exists in a same quadrant, the collision potential energy combination is a potential energy of the obstacle.

In a possible implementation, if all the vehicles with the preset collision risk level are not distributed in four different quadrants, the decision and anti-collision module may further determine whether the foregoing surrounding vehicles are distributed in three different quadrants. When all the surrounding vehicles with the preset collision risk level are distributed in three different quadrants, the decision and anti-collision module may further determine a safe direction of the ego-vehicle for obstacle avoidance with reference to the potential energy decomposition and combination method provided in this application. Specifically, the decision and anti-collision module first separately calculates a collision potential energy combination of all obstacles in a same quadrant; then, determines orthogonal directions of collision potential energy combinations in different quadrants; and then, determines a combination of all directions in an obstacle-free quadrant, uses a direction of the combination of all the directions in the obstacle-free quadrant as the direction of the second velocity, and uses a magnitude greater than or equal to the magnitude of the maximum velocity of the surrounding vehicles as the magnitude of the second velocity.

Figure 9:
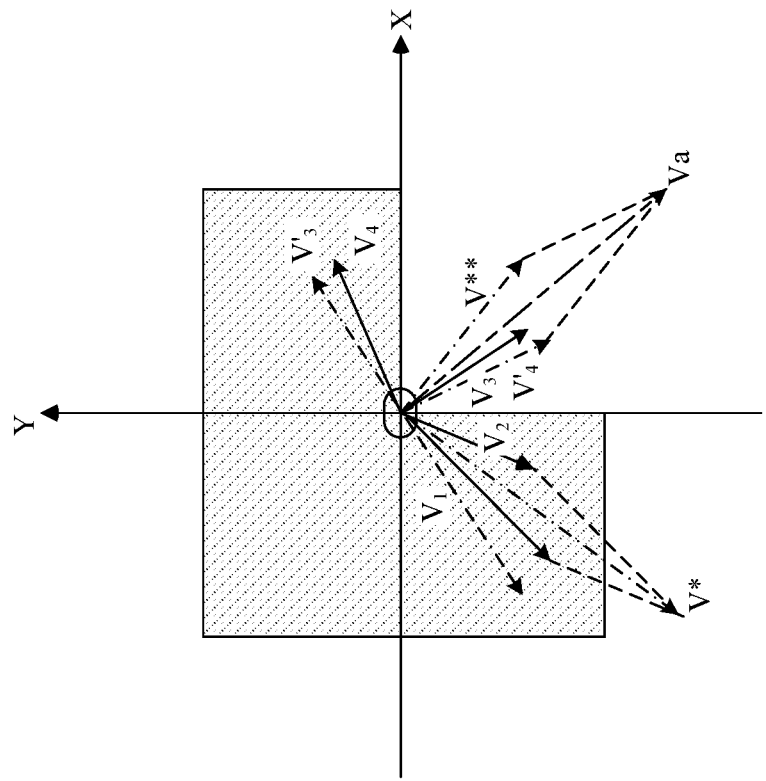
FIG. 9 is a schematic diagram of obstacle distribution in three quadrants according to this application.
Figure 9:
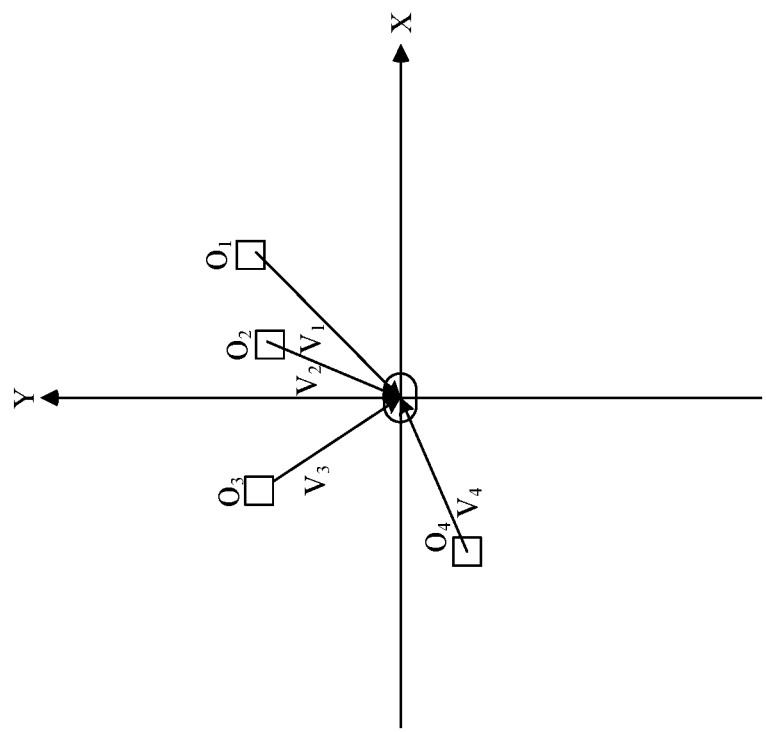

FIG. 9 is a schematic diagram in which all surrounding vehicles with a preset collision risk level are distributed in three different quadrants according to this application. As shown in the figure, surrounding vehicles $O_1$, $O_2$, $O_3$, and $O_4$ are respectively distributed in a first quadrant, a second quadrant, and a third quadrant, where the first quadrant includes $O_1$ and $O_2$. A potential energy of each obstacle may be calculated in step S301, and the potential energy has a direction and a magnitude. Next, the decision and anti-collision module may determine the second velocity based on the following steps:

1: First calculate a collision potential energy combination of all surrounding vehicles with the preset collision risk level in each quadrant.

As shown in FIG. 9, only the first quadrant has two obstacles. The decision and anti-collision module needs to calculate a combination of collision potential energies of $O_1$ and $O_2$ in the first quadrant. Because both directions of velocities of $O_1$ and $O_2$ point to the ego-vehicle, parallel translation of a potential energy in different quadrants does not change a magnitude and a direction of the potential energy. To more clearly indicate the combination of the collision potential energies of $O_1$ and $O_2$, the collision potential energies $V_1$ and $V_2$ of the original $O_1$ and $O_2$ are translated in parallel to the third quadrant with the origin as a start point. In this case, the potential energy combination of $O_1$ and $O_2$ is a diagonal V* with the origin as a start point in a parallelogram established by using $V_1$ and $V_2$.

There is only one obstacle in each of the second quadrant and the third quadrant. In this case, it may be understood that a collision potential energy combination of the quadrant is a collision potential energy of the obstacle.

2: Determine an orthogonal direction of the collision potential energy combination in each quadrant.

As shown in FIG. 9, based on a principle that parallel translation of a potential energy in different coordinate systems does not change a magnitude and a direction of the potential energy, a collision potential energy of $O_3$ may be translated in parallel to the fourth quadrant, and a collision potential energy of $O_4$ may be translated in parallel to the first quadrant. The orthogonal direction of the collision potential energy combination is a direction perpendicular to the collision potential energy combination. In FIG. 9, the collision potential energy combination of the obstacles in the first quadrant is V*, and an orthogonal direction perpendicular to V* is V**. Correspondingly, an orthogonal direction of a potential energy combination of the obstacle $O_3$ in the second quadrant is V'$_3$, and an orthogonal direction of a potential energy combination of the obstacle $O_4$ in the third quadrant is V'$_4$.

3: Calculate a collision potential energy combination and/or a combination of orthogonal directions of collision potential energy combinations in an obstacle-free quadrant, and use the direction as the direction of the second velocity.

As shown in FIG. 9, orthogonal directions of the potential energy combination of $O_3$ of the second quadrant are separately distributed in the first quadrant and the third quadrant, and both the two quadrants have an obstacle. In this case, only the orthogonal direction of the collision potential energy combination in the first quadrant and the orthogonal direction of the collision potential energy combination in the third quadrant need to be considered. Specifically, a new collision potential energy combination $V_a$ may be learned by using the collision potential energy combination calculation method in the foregoing step 1. That is, $V_a$ is the direction of the second velocity.

4: The decision and anti-collision module may further determine a maximum velocity based on velocities of all the surrounding vehicles with the preset collision risk level, and use a magnitude greater than or equal to a magnitude of the maximum velocity as the magnitude of the second velocity.

S307: When all the surrounding vehicles with the preset collision risk level are not distributed in three different quadrants, determine whether all the surrounding vehicles with the preset collision risk level are distributed in two quadrants.

S308: When all the surrounding vehicles with the preset collision risk level are distributed in two quadrants, determine whether all the surrounding vehicles with the preset collision risk level are distributed in two adjacent quadrants.

S309: When all the surrounding vehicles with the preset collision risk level are distributed in two adjacent quadrants, first calculate a collision potential energy combination of all the surrounding vehicles with the preset collision risk level in a same quadrant, determine an orthogonal direction of each collision potential energy combination, remove an orthogonal direction in an obstacle-exist quadrant, then calculate a combination of orthogonal directions in an obstacle-free quadrant as the direction of the second velocity, and use a magnitude greater than or equal to a magnitude of a maximum velocity of all the surrounding vehicles with the preset collision risk level as the magnitude of the second velocity.

In a possible implementation, for the second velocity, collision potential energy combinations of obstacles in the two quadrants may be further compared in the obstacle-free quadrant. When the collision potential energy combinations in the two quadrants are equal, a combination of the collision potential energy combinations in the two quadrants is calculated, and the combination of the collision potential energy combinations in the two quadrants is used as the second velocity. A direction of the combination of the collision potential energy combinations in the two quadrants is the direction of the safe velocity, and a magnitude of the combination of the collision potential energy combinations in the two quadrants is the magnitude of the safe velocity. When the collision potential energy combinations in the two quadrants are not equal, a combination of orthogonal directions of the collision potential energy combinations in the two quadrants is calculated, and the combination of orthogonal directions of the collision potential energy combinations in the two quadrants is used as the second velocity. A magnitude of the orthogonal direction of the collision potential energy combination is a magnitude of the collision potential energy combination, and a direction of the orthogonal direction of the collision potential energy combination is a direction perpendicular to the collision potential energy combination.

In a possible implementation, when all the surrounding vehicles with the preset collision risk level are distributed in two adjacent quadrants, the decision and anti-collision module determines the second velocity based on the following steps:

1: Calculate a potential energy combination of all the surrounding vehicles with the preset collision risk level in a same quadrant.

2: Determine an orthogonal direction of a potential energy combination in each quadrant.

3: Remove an orthogonal direction of a collision potential energy combination in an obstacle-exist quadrant.

4: Compare collision potential energy combinations of obstacles in the two quadrants; and when the collision potential energy combinations in the two quadrants are equal, calculate a combination of the collision potential energy combinations in the two quadrants, and use the combination of the collision potential energy combinations in the two quadrants as the second velocity; or when the collision potential energy combinations in the two quadrants are not equal, calculate a combination of orthogonal directions of the collision potential energy combinations in the two quadrants, and use the combination of orthogonal directions of the collision potential energy combinations in the two quadrants as the second velocity. A magnitude of the orthogonal direction of the collision potential energy combination is a magnitude of the collision potential energy combination.

Figure 10:
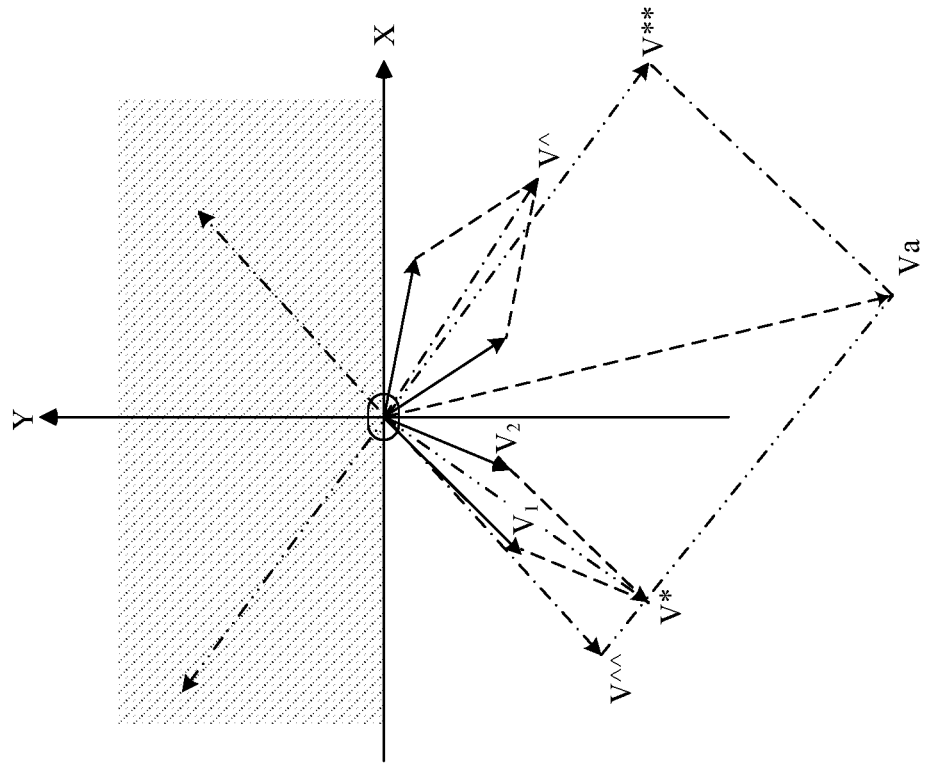
FIG. 10 is a schematic diagram of obstacle distribution in two adjacent quadrants according to this application.
Figure 10:
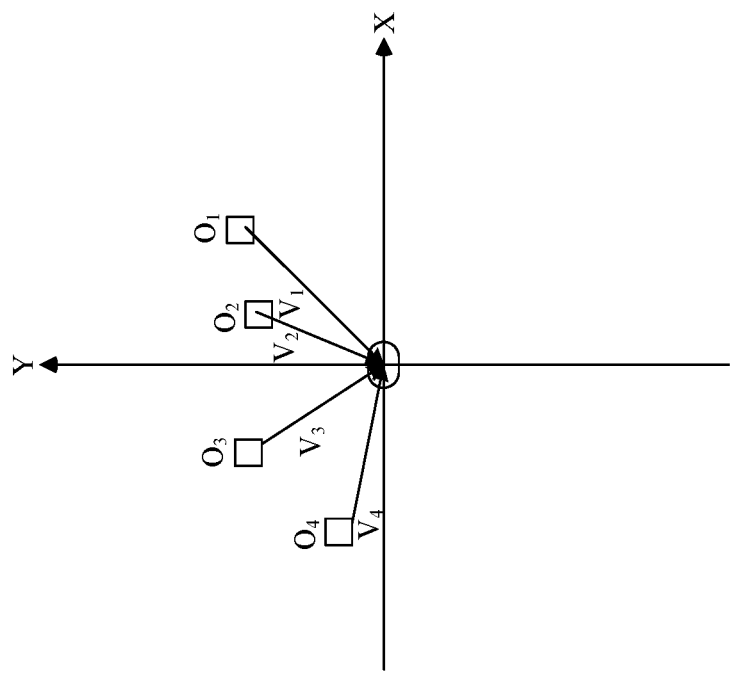

FIG. 10 is an example in which all vehicles with a preset collision risk level are distributed in two adjacent quadrants according to this application. As shown in the figure, surrounding vehicles $O_1$ and $O_2$ are distributed in the first quadrant, and $O_3$ and $O_4$ are distributed in the second quadrant. A potential energy combination of $O_1$ and $O_2$ is $V^*$, and a potential energy combination of $O_3$ and $O_4$ is $V^\wedge$. Then, orthogonal directions of $V^*$ and $V^\wedge$ are respectively determined as $V^{**}$ and $V^{\wedge\wedge}$. Then, magnitudes of $V^*$ and $V^\wedge$ are compared. When $V^*$ and $V^\wedge$ are not equal, a potential energy combination $V_a$ of $V^{**}$ and $V^{\wedge\wedge}$ is calculated, a direction of $V_a$ is used as the direction of the second velocity, and a velocity of $V_a$ is used as the second velocity. When $V^*$ and $V^\wedge$ are equal, a combination of $V^*$ and $V^\wedge$ is calculated, a direction of the potential energy combination of $V^*$ and $V^\wedge$ is used as the direction of the second velocity, and a magnitude of the potential energy combination of $V^*$ and $V^\wedge$ is used as the magnitude of the second velocity.

It should be noted that in FIG. 10, only a process of determining the second velocity when $V^*$ and $V^\wedge$ are not equal is used as an example. In FIG. 10, a process of determining the second velocity when $V^*$ and $V^\wedge$ are equal is not shown.

S310: When all the surrounding vehicles with the preset collision risk level are not distributed in two adjacent quadrants, calculate collision potential energy combinations of all the surrounding vehicles with the preset collision risk level, list an orthogonal direction of each collision potential energy combination, then calculate a combination of orthogonal directions that belong to a same quadrant, use any direction of the combination of the orthogonal directions as the direction of the second velocity, and use a magnitude greater than or equal to a magnitude of a maximum velocity of the surrounding vehicles as the magnitude of the second velocity. A magnitude of orthogonal directions in a same quadrant is a collision potential energy combination in the quadrant.

Figure 11:
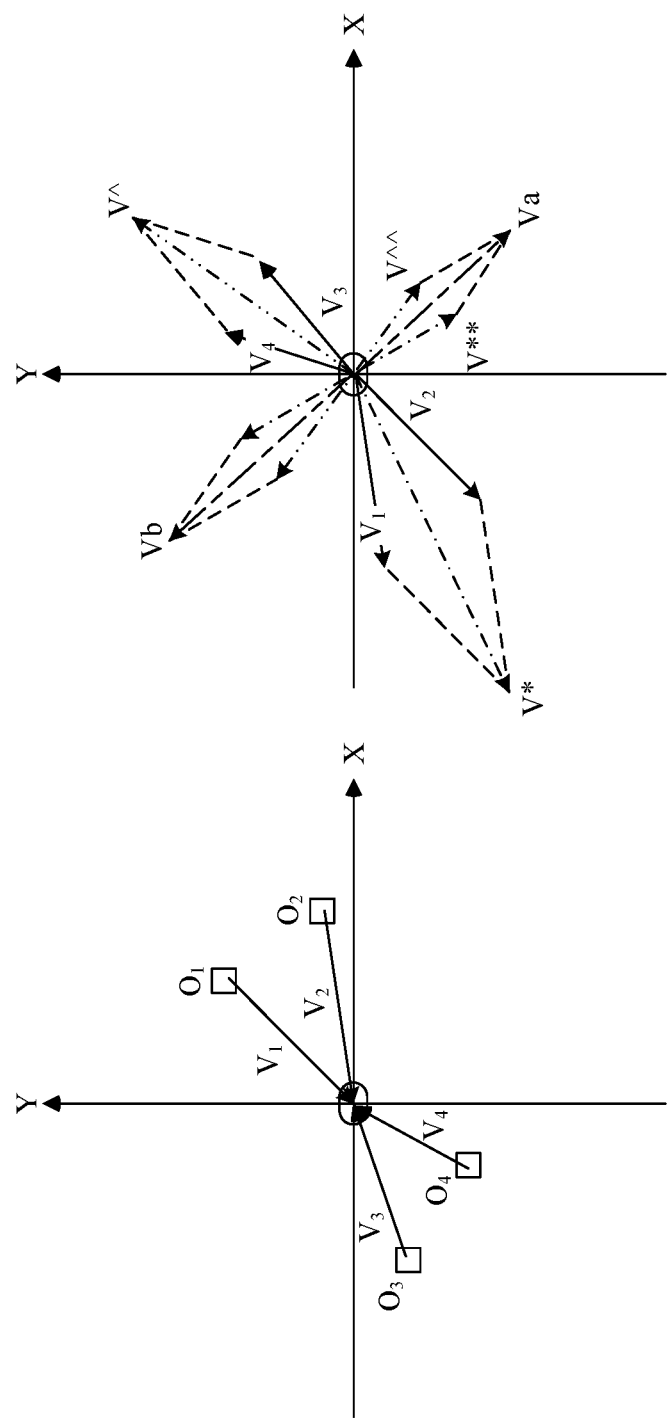
FIG. 11 is a schematic diagram of obstacle distribution in two non-adjacent quadrants according to this application.

Similar to step S309, FIG. 11 is an example in which all surrounding vehicles with a preset collision risk level are not distributed in two adjacent quadrants according to this application. As shown in the figure, surrounding vehicles $O_1$ and $O_2$ are distributed in the first quadrant, and $O_3$ and $O_4$ are distributed in the third quadrant. A potential energy combination of $O_1$ and $O_2$ is $V^*$, and a potential energy combination of $O_3$ and $O_4$ is $V^\wedge$. Then, orthogonal directions of $V^*$ and $V^\wedge$ are respectively determined as $V^{}$ and $V^{\wedge\wedge}$. Combinations $V_a$ and $V_b$ of $V^{}$ and $V^{\wedge\wedge}$ are calculated. Any direction is used as the direction of the second velocity, and further a magnitude greater than or equal to a magnitude of a maximum velocity of the surrounding vehicles is used as the magnitude of the second velocity.

S311: When it is determined that all the surrounding vehicles with the preset collision risk level are distributed in only one quadrant, calculate a collision potential energy combination of all the surrounding vehicles with the preset collision risk level, use an orthogonal direction of the collision potential energy combination as the direction of the second velocity, and use a magnitude greater than or equal to a magnitude of a maximum velocity of the surrounding vehicles as the magnitude of the second velocity.

Figure 12:
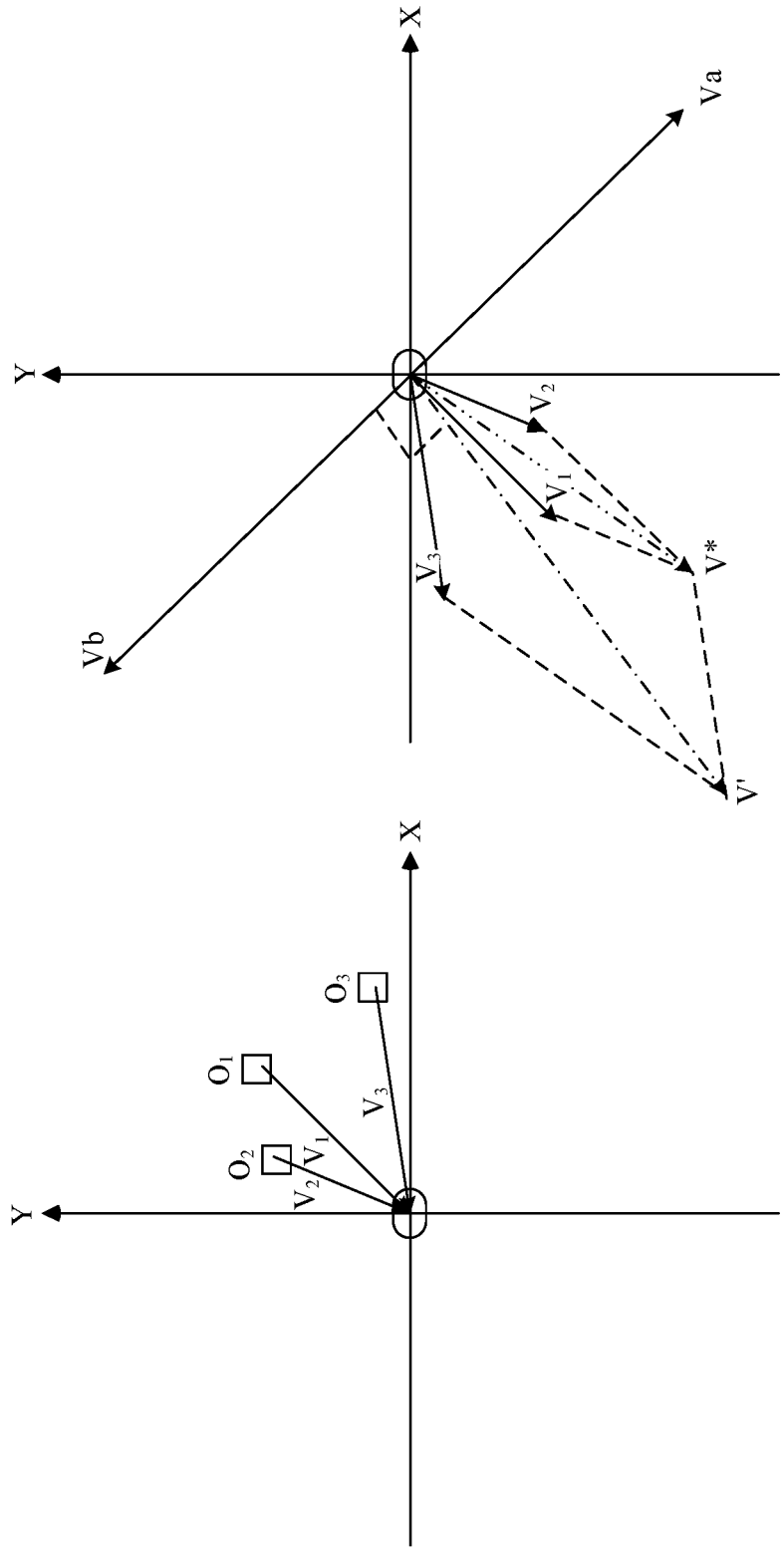
FIG. 12 is a schematic diagram of obstacle distribution in a same quadrant according to this application.

FIG. 12 is an example in which all surrounding vehicles with a preset collision risk level are distributed in a same quadrant according to this application. As shown in the figure, surrounding vehicles $O_1$, $O_2$, $O_3$, and $O_4$ are distributed in the first quadrant. The decision and anti-collision module calculates a collision potential energy combination of the four obstacles, and uses any direction of orthogonal directions of the collision potential energy combination as the direction of the second velocity. For example, $V_a$ and $V_b$ are the orthogonal directions of the collision potential energy combination of the obstacles in the first quadrant. The decision and anti-collision module may select any direction as the direction of the second velocity. Further, the orthogonal direction of the collision potential energy combination is used as the direction of the second velocity, and a magnitude greater than or equal to a magnitude of a maximum velocity of the surrounding vehicles is used as the magnitude of the second velocity.

It should be noted that in FIG. 12, various possibilities of determining the second velocity by the decision and anti-collision control module when obstacles are distributed in different quadrants are listed. In specific implementation, when determining that all the surrounding vehicles with the preset collision risk level meet any possibility, the decision and anti-collision control module may determine the second velocity based on the steps of the foregoing method.

In a possible implementation, in addition to using a magnitude greater than or equal to a magnitude of a maximum velocity of all surrounding obstacles as the second velocity, the obstacle avoidance velocity may be determined in another manner. For example, the magnitude of the second velocity may be defined by using N times the magnitude of the maximum velocity of the surrounding obstacles as a reference.

Optionally, when the decision and anti-collision module determines directions of a plurality of obstacle avoidance velocities, probabilities of a collision between obstacles and the ego-vehicle may be calculated according to types, relative velocities, and relative distances of the obstacles, calculated probabilities are sorted sequentially by values, and a direction in which an obstacle with a smallest probability is located is preferably selected as the direction of the second velocity. Alternatively, directions of a plurality of optional velocities are displayed on an in-vehicle display screen, and collision possibilities are indicated. The driver selects a direction of a velocity, and the controller controls the intelligent vehicle to travel based on the direction selected by the driver.

S215: The decision and anti-collision module sends the second velocity to the arbitration module.

S216: When a first preset condition is met, the arbitration module selects the first velocity as a traveling velocity of the intelligent vehicle.

The velocity determined by the arbitration module may also be referred to as an optimal velocity. The optimal velocity may implement an effective obstacle avoidance process of the intelligent vehicle, ensure that the intelligent vehicle does not collide with a surrounding obstacle, reduce a possibility of a collision between the intelligent vehicle and the surrounding obstacle, and improve safety of the intelligent vehicle in an automated driving process.

S217: Determine whether a direction of the first velocity belongs to a travelable range.

S218: When determining that the direction of the first velocity belongs to the travelable range, the arbitration module sends a first control instruction to the execution system, where the first control instruction includes the first velocity.

S219: The execution system controls the intelligent vehicle to travel at the first velocity.

In a possible implementation, after selecting the first velocity as the traveling velocity of the intelligent vehicle, the arbitration module may further determine whether the direction of the first velocity belongs to the travelable range. Specifically, the direction of the first velocity obtained by using the potential energy decomposition and combination method is a theoretically safe velocity, and the first velocity needs to be further checked based on an actual situation, so as to improve safety of the intelligent vehicle in a traveling process. Criteria for determining, by the arbitration module, whether the direction of the first velocity is travelable include: no collision with a dynamic obstacle (such as a motor vehicle, a non-motor vehicle, a pedestrian, an animal, or a cargo dropped during movement), no collision with a static obstacle (such as an infrastructure like a median strip, a guardrail, a roadbed, or a street lamp), and no violation of a traffic rule (such as driving against the direction of traffic or running a red light). The arbitration module may obtain, from the first sensing module, data of an obstacle that is collected by the sensing device, establish a world model around the ego-vehicle by using the data for a traveling environment of the intelligent vehicle, and filter physical spaces in the world model by using the foregoing criteria to obtain all travelable areas. If the direction of the first velocity is within the travelable range, the arbitration module sends a control instruction to the execution system, so as to instruct the execution system to control the intelligent vehicle to travel at the first velocity. If the direction of the first velocity is not within the travelable area, the arbitration module determines that there is a safety risk in the direction of the first velocity. In this case, the arbitration module executes only a braking command to avoid a collision or reduce a collision loss.

Optionally, the arbitration module may further obtain collision potential energies of all the surrounding vehicles with the preset collision risk level. When determining that all the collision potential energies are less than a first threshold, the arbitration module selects the first velocity as the traveling velocity of the intelligent vehicle, and sends the first control instruction to the execution system, so that the execution system controls the intelligent vehicle to travel at the first velocity in the first area. That is, the first preset condition is that the collision potential energies of all the surrounding vehicles with the preset collision risk level are less than the first threshold. In this case, the arbitration module controls the intelligent vehicle to travel based on the velocity determined by the working channel.

Optionally, in step S217 and step S218, the arbitration module may directly send the first control instruction to the execution system without determining whether the direction of the first velocity belongs to the travelable range.

S220: When a second preset condition is met, the arbitration module selects the second velocity as the traveling velocity of the intelligent vehicle.

S221: The arbitration module determines whether the direction of the second velocity belongs to the travelable range.

S222: When the direction of the second velocity belongs to the travelable range, the arbitration module sends a second control instruction to the execution system, where the second control instruction includes the second velocity.

S223: The execution system controls the intelligent vehicle to travel at the second velocity.

When the arbitration module determines that the collision potential energies of all the surrounding vehicles with the preset collision risk level are greater than or equal to the first threshold, the arbitration module selects the second velocity as the traveling velocity of the intelligent vehicle. That is, the second preset condition is that the collision potential energies of all the surrounding vehicles with the preset collision risk level are greater than or equal to the first threshold. In this case, the arbitration module controls the intelligent vehicle to travel based on the velocity determined by the safe channel.

Further, the arbitration module further determines whether the direction of the second velocity belongs to the travelable range. Specifically, the direction of the second velocity obtained by using the potential energy decomposition and combination method is a theoretically safe velocity, and the second velocity needs to be further checked based on an actual situation, so as to improve safety of the intelligent vehicle in a traveling process. Criteria for determining, by the arbitration module, whether the direction of the second velocity is travelable include: no collision with a dynamic obstacle (such as a motor vehicle, a non-motor vehicle, a pedestrian, an animal, or a cargo dropped during movement), no collision with a static obstacle (such as an infrastructure like a median strip, a guardrail, a roadbed, or a street lamp), and no violation of a traffic rule (such as driving against the direction of traffic or running a red light). The arbitration module may obtain, from the first sensing module, data of an obstacle that is collected by the sensing device, establish a world model around the ego-vehicle by using the data for a traveling environment of the intelligent vehicle, and filter physical spaces in the world model by using the foregoing criteria to obtain all travelable areas. If the direction of the second velocity is within the travelable area, the arbitration module sends a control instruction to the execution system, so as to instruct the execution system to control the intelligent vehicle to travel at the second velocity. If the direction of the second velocity is not within the travelable area, the arbitration module determines that there is a safety risk in the direction of the second velocity. In this case, the arbitration module executes only a braking command to avoid a collision or reduce a collision loss.

It should be noted that processes of determining the first velocity and the second velocity by the safe channel and the working channel are two mutually independent processes. The two processes are independent of each other and may be processed in parallel. That is, step S210 to step S212 and step S213 to step S215 may be performed in parallel. In addition, step S216 to step S219 and step S220 to step 223 are also two independent determining branches. When the first preset condition is met, the arbitration module may further determine whether the direction of the first velocity belongs to the travelable range, or directly send the first velocity to the execution system, so as to control the intelligent vehicle to control the vehicle to travel based on the velocity determined by the working channel. When the second preset condition is met, the arbitration module further determines whether the direction of the second velocity belongs to the travelable range. When the direction of the second velocity is a travelable direction, the arbitration module sends the second velocity to the execution system, so as to control the intelligent vehicle to control the vehicle to travel based on the direction and the velocity determined by the safe channel. In addition, a method for establishing a world model is not limited in this application. In specific implementation, a model that reflects a situation of a surrounding vehicle obstacle may be established based on a service requirement.

The intelligent vehicle obstacle avoidance method provided in this application is a process of actively and continuously implementing effective obstacle avoidance in a scenario with a collision risk. The process is an iterative process in an intelligent vehicle traveling process. Provided that a collision potential energy of any obstacle is greater than or equal to the first threshold, the process is continuously cyclically performed. That is, provided that there is a collision risk, the safe channel calculates the collision potential energy of the obstacle, and further determines the second velocity based on the collision potential energy.

According to the foregoing described content, in the anti-collision method provided in this application, an optimal velocity that meets functional safety requirements in any area can be obtained based on the potential energy decomposition and combination method, and is further checked by using the travelable area, so as to finally determine an optimal velocity of the intelligent vehicle for obstacle avoidance. In this application, a possibility of a collision between the ego-vehicle and a surrounding obstacle can be comprehensively determined by using a distance and a relative velocity between the obstacle and the ego-vehicle, and a collision risk of the ego-vehicle can be better identified, so as to solve a problem of mis-determining or missed determining caused by a determining method only based on a braking distance and a minimum braking time in a conventional technology. Further, in the method provided in this application, not only a collision with a vehicle that comes from the front of the ego-vehicle can be avoided, but also a collision with a vehicle that comes from the rear, the side, and the like of the ego-vehicle can be avoided. In a conventional technical method, only a collision with a vehicle that comes from the front of the ego-vehicle can be avoided. By comparison, an obstacle avoidance capability of the intelligent vehicle is improved, not only the intelligent vehicle can be controlled to decelerate, but also the intelligent vehicle can be controlled to accelerate based on a determined obstacle avoidance direction, thereby enabling the intelligent vehicle to implement obstacle avoidance in each direction. In addition, in the method provided in this application, a more accurate obstacle avoidance direction and velocity are provided, which can ensure that the intelligent vehicle implements obstacle avoidance based on an optimal safe direction and velocity at a current moment, thereby avoiding a collision between the ego-vehicle and a surrounding vehicle.

Figure 13:
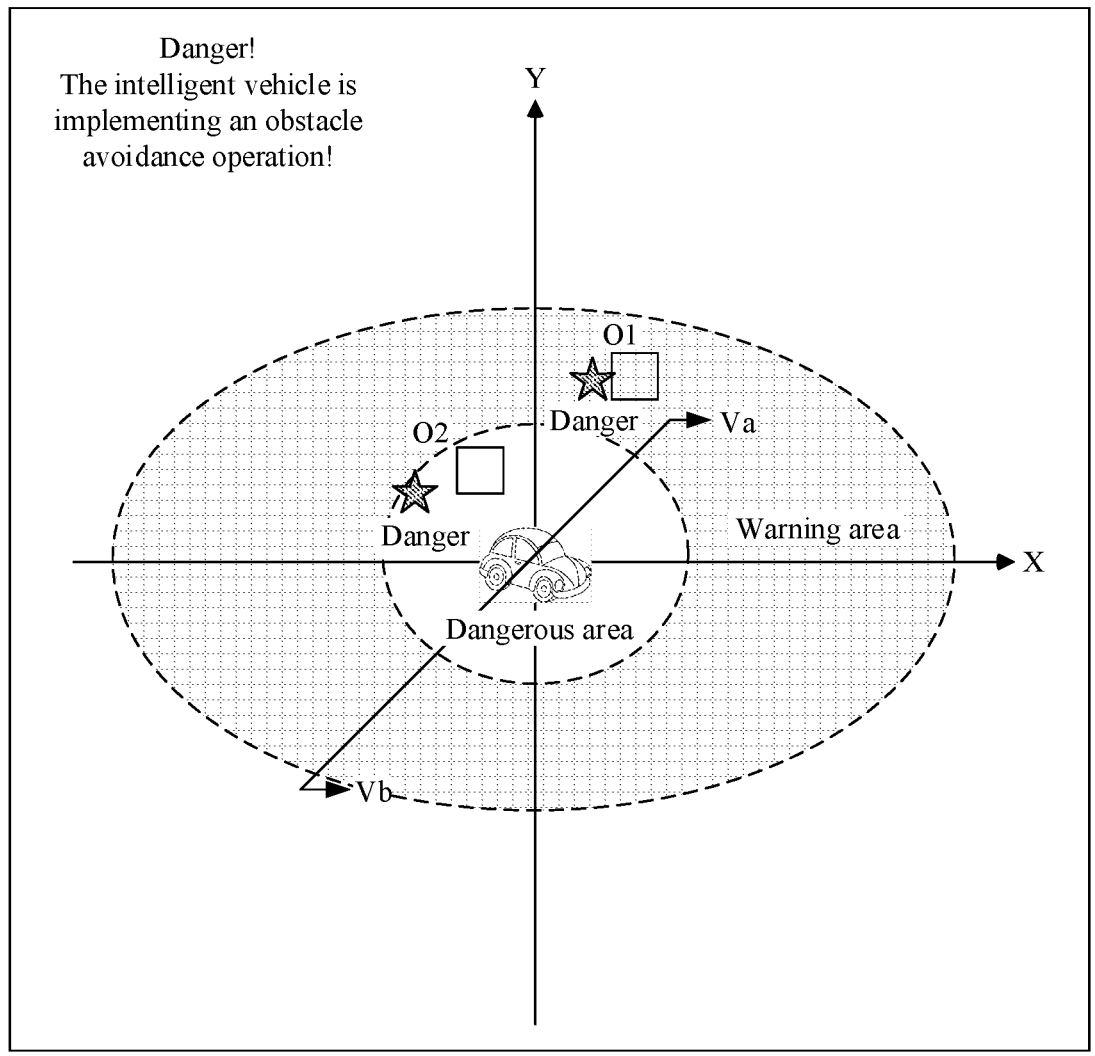
FIG. 13 is a schematic diagram of a human-computer interaction system of an intelligent vehicle according to this application.

In a possible implementation, FIG. 13 is a schematic diagram of an interaction system according to this application. As shown in the figure, the interaction system may remind, in a plurality of forms, a driver to pay attention to a situation of a surrounding vehicle, so that the driver takes over an intelligent vehicle or sends an execution instruction to the intelligent vehicle, so as to control traveling of the intelligent vehicle, for example, an audio reminder, a seat vibration reminder, and an in-vehicle lamp flashing reminder. A man-machine interaction system may further mark different levels and areas by using different colors or backgrounds.

Specifically, a man-machine interaction process between the intelligent vehicle and the driver may be implemented in at least one of the following manners:

Manner 1: The intelligent vehicle displays a risk of a collision between the intelligent vehicle and a surrounding obstacle, the first velocity, and the second velocity by using a text on an in-vehicle display interface of the intelligent vehicle. For example, in FIG. 13, $V_a$ and $V_b$ are optional obstacle avoidance directions, and the driver may select any one as the traveling direction of the vehicle. In addition to marking $V_a$ and $V_b$ as optional obstacle avoidance directions, different marks may also be used to indicate a collision risk in traveling in the direction of the obstacle. For example, in directions of obstacles $O_1$ and $O_2$ in FIG. 13, "dangerous" is indicated by using a pentagram mark and a text.

Manner 2: The intelligent vehicle broadcasts a risk of a collision between the intelligent vehicle and the surrounding obstacle, the first velocity, and the second velocity using voice; or the intelligent vehicle prompts a risk of a collision between the intelligent vehicle and the surrounding obstacle through seat vibration.

Manner 3: The intelligent vehicle prompts a risk of a collision between the intelligent vehicle and the surrounding obstacle through in-vehicle lamp flashing. In a case of a danger, the driver may also be reminded through rapid lamp flashing.

In a possible implementation, after the intelligent vehicle performs obstacle avoidance based on the foregoing methods, an original traveling track determined by a decision module may be changed, and the original traveling track further needs to be re-planned or adjusted with reference to a road condition in which the intelligent vehicle is located at a current moment, thereby ensuring that the intelligent vehicle successfully reaches a destination specified by the driver.

Optionally, in addition to determining the velocity by using the foregoing controller, the intelligent vehicle may also receive the velocity selected by the driver in a form such as using an interface or via voice. After receiving the foregoing velocity control instruction, the intelligent vehicle may control the intelligent vehicle to travel at the velocity.

By using the foregoing man-machine interaction system, driving experience of the driver can be improved, and the driver can better take over and control the intelligent vehicle. In addition, by using the man-machine interaction system, the driver can also learn of a situation of an environment in which the intelligent vehicle is located, thereby reducing the driver's fear because the driver cannot learn of a traveling area of the intelligent vehicle in an emergency case. In an emergency case, the driver may further determine, based on a situation displayed in the man-machine interaction system, whether to switch a driving mode to a manual driving mode, so that the driver takes over control of the intelligent vehicle.

In a possible implementation, in addition to determining a collision potential energy by using a relative velocity and a relative distance between an obstacle and an ego-vehicle, and further determining a risk of a collision between the obstacle and the ego-vehicle, different weights may be added for different types of vehicles based on types of obstacles. For specific weight setting, degrees of damage of a collision between different types of obstacles and the ego-vehicle may be considered. Further, an optimal direction and velocity for obstacle avoidance are determined with reference to the foregoing degrees of damage of a collision.

In another possible implementation, in addition to obtaining sensing data of a surrounding obstacle that is detected by a sensing device in an intelligent vehicle in which a controller is located, the controller may further obtain information about another vehicle that is sent by another obstacle to the intelligent vehicle, where the information includes track information of the another vehicle. An obstacle avoidance process of the intelligent vehicle may also be implemented with reference to the information about the vehicle. The another obstacle may send information to the intelligent vehicle by using a vehicle to everything (vehicle to everything, V2X) communication technology. When there are two or more obstacle avoidance directions, it may further be determined, based on a type of an obstacle, a distance to the ego-vehicle, and a relative velocity, a probability that the obstacle collides with the ego-vehicle, and a probability of avoiding the obstacle is displayed on an interface. The driver may select any travelable direction as the obstacle avoidance direction by using the interface.

In another possible implementation, when the second velocity determined by the safe channel has a plurality of directions, a safest direction may be selected based on a risk degree of a collision with the obstacle as the direction of the second velocity, where the risk degree of a collision includes one or more factors such as a probability of a collision with the obstacle or a degree of damage of a collision, and the degree of damage of a collision may be calibrated based on a size, a relative velocity, and a relative distance of the obstacle. A larger obstacle, a faster relative velocity, and a shorter relative distance result in a higher degree of damage of a collision. In the foregoing manner, when there are a plurality of directions of the second velocity, an optimal direction may be selected based on the collision risk degree to avoid an obstacle, thereby further improving safety of automated driving. In addition, the collision risk degree may be displayed to the driver by using the man-machine interaction interface, so that a direction of a final velocity is selected by the driver, so as to control the vehicle to travel at the velocity selected by the driver.

It should be noted that, to make the description brief, the foregoing method embodiments are expressed as a combination of a series of actions. However, a person skilled in the art should appreciate that this application is not limited to the described action sequence. In addition, a person skilled in the art should also appreciate that all the embodiments described in this specification are preferred embodiments, and the related actions are not necessarily mandatory to this application.

Another appropriate step combination that a person skilled in the art can think of based on the content described above also falls within the protection scope of this application. In addition, a person skilled in the art should also appreciate that all the embodiments described in this specification are preferred embodiments, and the related actions are not necessarily mandatory to this application.

Figure 14:
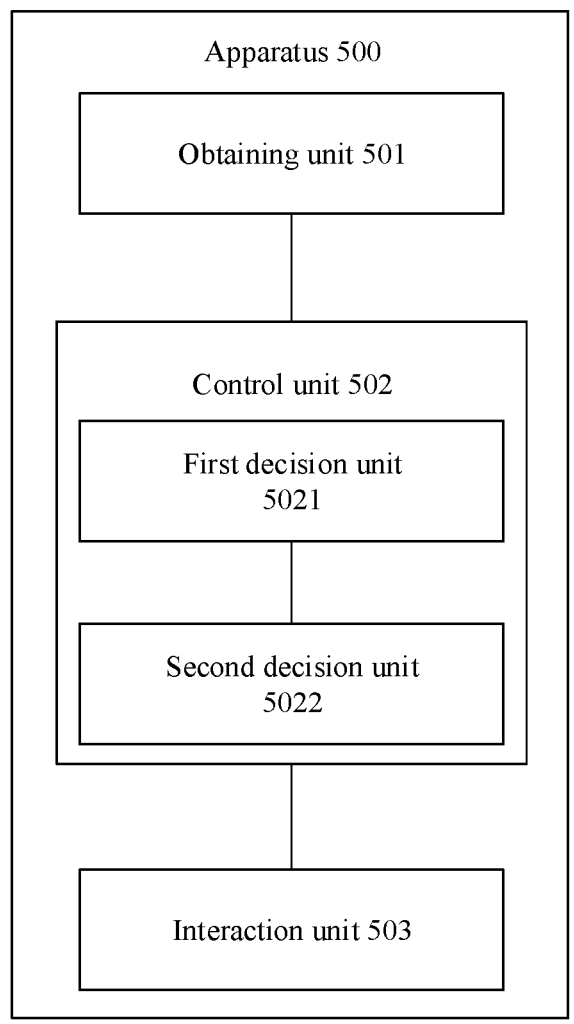
FIG. 14 is a schematic diagram of a structure of a vehicle control apparatus according to this application.
Figure 15:
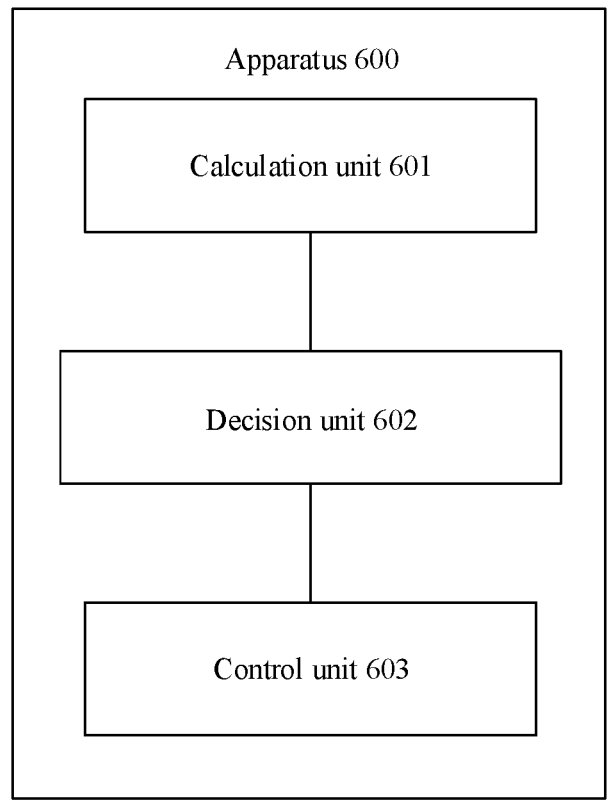
FIG. 15 is a schematic diagram of a structure of another vehicle control apparatus according to this application.
Figure 16:
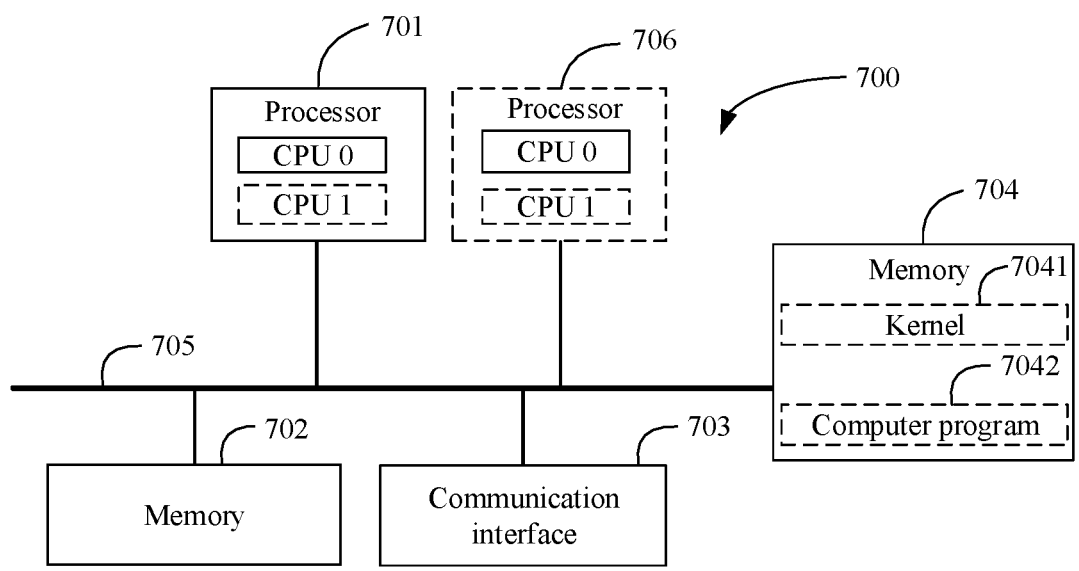
FIG. 16 is a schematic diagram of a structure of a controller according to this application.

With reference to FIG. 1 to FIG. 13, the foregoing describes in detail the anti-collision method provided in this application. With reference to FIG. 14 to FIG. 16, the following describes a vehicle control apparatus, a controller, and an intelligent vehicle provided in this application.

FIG. 14 is a schematic diagram of a vehicle control apparatus 500 according to this application. As shown in the figure, the apparatus 500 includes an obtaining unit 501, and the obtaining unit 501 is configured to obtain a first velocity planned for an intelligent vehicle to travel in a first area, where the first area is an area in a process in which the intelligent vehicle travels to a destination; and obtain a second velocity planned for the intelligent vehicle to travel in the first area, where the second velocity is obtained based on a collision potential energy, and the first velocity and the second velocity each include a direction and a magnitude; and the first velocity, the second velocity, and a risk of a collision between the intelligent vehicle and a surrounding obstacle are used to determine an optimal velocity of the intelligent vehicle, and the optimal velocity includes a magnitude and a direction.

Optionally, the collision potential energy is used to identify a trend of a collision between the surrounding obstacle and the intelligent vehicle.

Optionally, the apparatus 500 further includes a control unit 502, configured to determine an optimal velocity of the intelligent vehicle for collision avoidance based on the first velocity, the second velocity, and the risk of a collision between the intelligent vehicle and the surrounding obstacle, where the optimal velocity includes a magnitude and a direction.

Optionally, the control unit 502 further includes a first decision unit 5021, configured to receive a velocity control instruction, and control the intelligent vehicle by using the velocity control instruction to travel.

Optionally, the control unit 502 further includes a second decision unit 5022, configured to: when a first preset condition is met, determine the first velocity as the optimal velocity, where the first preset condition is that a collision potential energy of any surrounding obstacle is less than a first threshold.

Optionally, the control unit 502 further includes a second decision unit 5022, further configured to: when a second preset condition is met, determine the second velocity as the optimal velocity, where the second preset condition is that a collision potential energy of any surrounding obstacle is greater than or equal to a first threshold.

Optionally, the apparatus 500 further includes an interaction unit 503, configured to indicate a collision risk of the intelligent vehicle in at least one of the following manners: the intelligent vehicle displays a risk of a collision between the intelligent vehicle and the surrounding obstacle, the first velocity, and the second velocity by using a text on an in-vehicle display interface of the intelligent vehicle; or the intelligent vehicle broadcasts a risk of a collision between the intelligent vehicle and the surrounding obstacle, the first velocity and the second velocity using voice; or the intelligent vehicle prompts a risk of a collision between the intelligent vehicle and the surrounding obstacle through seat vibration; or the intelligent vehicle prompts a risk of a collision between the intelligent vehicle and the surrounding obstacle through in-vehicle lamp flashing.

Optionally, the first decision unit 5021 is configured to implement a function of obtaining the first velocity in the working channel in the foregoing method, and the second decision unit 5022 is configured to implement a function of obtaining the second velocity in the safe channel in the foregoing method. The first decision unit 5021 and the second decision unit 5022 may alternatively be combined into one decision unit, and the decision unit is configured to separately implement functions of determining the first velocity and the second velocity by using the safe channel and the working channel.

It should be understood that the apparatus 500 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, when the vehicle control methods shown in FIG. 3A to FIG. 4C are implemented by using software, the apparatus 500 and each module thereof may also be software modules.

The apparatus 500 in this embodiment of this application may correspondingly perform the methods described in the embodiments of this application. In addition, the foregoing and other operations and/or functions of the units in the apparatus 500 are separately used to implement corresponding procedures of the methods in FIG. 3A to FIG. 4C. For brevity, details are not described herein again.

FIG. 15 is a schematic diagram of a structure of another vehicle control apparatus 600 according to this application. As shown in the figure, the apparatus 600 includes a calculation unit 601, a decision unit 602, and a control unit 603.

The calculation unit 601 is configured to calculate a collision potential energy of a surrounding obstacle of an intelligent vehicle based on first sensing data, where the first sensing data includes a relative velocity and a relative distance between the surrounding obstacle and the intelligent vehicle;
    the decision unit 602 is configured to determine, based on the collision potential energy of the surrounding obstacle, a safe velocity for the intelligent vehicle to travel in a first area, where the first area is an area on a planned path of the intelligent vehicle; and
    the control unit 603 is configured to control the intelligent vehicle to travel at the safe velocity in the first area.

Optionally, the collision potential energy is used to identify a trend of a collision between the surrounding obstacle and the intelligent vehicle.

Optionally, the control unit 603 is further configured to: when a collision potential energy of any surrounding obstacle is greater than or equal to a first threshold, control the intelligent vehicle to travel at the safe velocity in the first area.

Optionally, the calculation unit 601 is further configured to calculate the collision potential energy of the surrounding obstacle by using the following formula:

$$f = k \cdot \frac{V^\alpha}{d^\beta} + C$$

where k, $\alpha$, and $\beta$ are constant coefficients, C is a constant, V is a magnitude of a relative velocity between a first obstacle and the intelligent vehicle, d is a relative distance between the first obstacle and the intelligent vehicle, and the first obstacle is any surrounding obstacle.

Optionally, the decision unit 602 is further configured to: determine a collision risk level of each surrounding obstacle based on a collision potential energy of the surrounding obstacle and a preset threshold, where the collision risk level includes safe, warning, and dangerous; select all surrounding obstacles with a preset collision risk level; and determine the safe velocity based on collision potential energies of all the selected surrounding obstacles with the preset collision risk level.

Optionally, the decision unit 602 is further configured to obtain the first sensing data, where the first sensing data is data obtained after initial data detected by a sensing device of the intelligent vehicle is analyzed and processed; establish a coordinate system that uses the intelligent vehicle as an origin and a traveling direction of the intelligent vehicle as an X-axis; and calculate a location of the surrounding obstacle in the coordinate system based on the first sensing data, where the location is used to indicate coordinates and a quadrant of the obstacle in the coordinate system.

Optionally, the decision unit 602 is further configured to: when all the surrounding obstacles with the preset safety risk level are distributed in four quadrants, identify a maximum safe angle in an obstacle-free area, use a direction of an angular bisector of the maximum safe angle as a direction of the safe velocity, and use a magnitude greater than or equal to a magnitude of a maximum velocity of the surrounding vehicles as a magnitude of the safe velocity.

Optionally, the decision unit 602 is further configured to: when all the surrounding obstacles with the preset safety risk level are distributed in three quadrants, separately calculate a combination of collision potential energies of all obstacles with the preset safety risk level in a same quadrant; determine an orthogonal direction of a collision potential energy combination in each quadrant; remove a collision potential energy combination and/or an orthogonal direction of a collision potential energy combination of all obstacles in an obstacle-exist quadrant; and calculate collision potential energy combinations and/or orthogonal directions of collision potential energy combinations in an obstacle-free quadrant, use a combination of all directions in the collision potential energy combinations and/or the orthogonal directions of collision potential energy combinations in the obstacle-free quadrant as a direction of the safe velocity, and use a magnitude greater than or equal to a magnitude of a maximum velocity of the surrounding vehicles as a magnitude of the safe velocity.

Optionally, the decision unit 602 is further configured to: when all the surrounding obstacles with the preset safety risk level are distributed in two adjacent quadrants, separately calculate a collision potential energy combination of all surrounding obstacles with the preset collision risk level in a same quadrant, and determine an orthogonal direction of each collision potential energy combination; and calculate a combination of orthogonal directions of collision potential energy combinations in an obstacle-free quadrant as a direction of the safe velocity, and use a magnitude greater than or equal to a magnitude of a maximum velocity of all the surrounding vehicles with the preset collision risk level as a magnitude of the safe velocity.

Optionally, the decision unit 602 is further configured to: when all the surrounding obstacles with the preset safety risk level are distributed in two adjacent quadrants, calculate a collision potential energy combination of all surrounding vehicles with the preset collision risk level in a same quadrant, and determine an orthogonal direction of each collision potential energy combination; compare collision potential energy combinations of obstacles in the two quadrants in an obstacle-free quadrant; and when the collision potential energy combinations in the two quadrants are equal, calculate a combination of the collision potential energy combinations in the two quadrants, and use the combination of the collision potential energy combinations in the two quadrants as the safe velocity; or when the collision potential energy combinations in the two quadrants are not equal, calculate a combination of orthogonal directions of the collision potential energy combinations in the two quadrants, and use the combination of the orthogonal directions of the collision potential energy combinations in the two quadrants as the safe velocity, where a magnitude of the orthogonal direction of the collision potential energy combination is a magnitude of the collision potential energy combination, and a direction of the orthogonal direction of the collision potential energy combination is a direction perpendicular to the collision potential energy combination.

Optionally, the decision unit 602 is further configured to: when all the surrounding obstacles with the preset safety risk level are distributed in two non-adjacent quadrants, separately calculate a collision potential energy combination of all surrounding obstacles with the preset collision risk level in a same quadrant, and determine an orthogonal direction of each collision potential energy combination; and calculate a combination of orthogonal directions of collision potential energy combinations that belong to a same quadrant, use any direction of the combination of the orthogonal directions of the collision potential energy combinations that belong to the same quadrant as a magnitude of the safe velocity, and use a magnitude greater than or equal to a magnitude of a maximum velocity of the surrounding vehicles as a magnitude of the safe velocity.

Optionally, the decision unit 602 is further configured to: when it is determined that all the surrounding vehicles with the preset collision risk level are distributed in only one quadrant, calculate a collision potential energy combination of all the surrounding vehicles with the preset collision risk level, use an orthogonal direction of the collision potential energy combination as a direction of the safe velocity, and use a magnitude greater than or equal to a magnitude of a maximum velocity of the surrounding vehicles as a magnitude of the safe velocity.

Optionally, the decision unit 602 is further configured to: determine whether the direction of the safe velocity belongs to a travelable range, where the travelable range is an area that meets the following criteria: no collision with a dynamic obstacle, no collision with a static obstacle, and no violation of a traffic rule, where the dynamic obstacle includes a motor vehicle, a pedestrian, or an animal; the static obstacle includes an infrastructure such as a median strip, a guardrail, a roadbed, or a street lamp; and the traffic rule includes driving against the direction of traffic or running a red light; and when the direction of the safe velocity belongs to the travelable range, send the safe velocity to the control unit 603, so that the control unit 603 controls the intelligent vehicle to travel at the safe velocity in the first area.

It should be understood that the apparatus 600 in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, when the vehicle control methods shown in FIG. 3A to FIG. 4C are implemented by using software, the apparatus 600 and each module thereof may also be software modules.

The apparatus 600 in this embodiment of this application may correspondingly perform the methods described in the embodiments of this application. In addition, the foregoing and other operations and/or functions of the units in the apparatus 600 are separately used to implement corresponding procedures of the methods in FIG. 3A to FIG. 4C. For brevity, details are not described herein again. In addition, the decision module 602 of the apparatus 600 may be corresponding to the second decision module 5022 in the apparatus 500, and is configured to implement a process of determining the second velocity by the decision and anti-collision module in the safe channel.

FIG. 16 is a schematic diagram of a controller 700 according to an embodiment of this application. As shown in the figure, the controller 700 includes a processor 701, a memory 702, a communication interface 703, and a memory 704. The processor 701, the memory 702, the communication interface 703, and the memory 704 communicate with each other by using a bus 705. The memory 702/704 is configured to store instructions, and the processor 701 is configured to execute the instructions stored in the memory 702/704. The memory 702/704 stores program code (e.g., kernel 7041 and/or computer program 7042 in the memory 704), and the processor 701 may invoke the program code stored in the memory 702/704 to perform the following operations:

obtaining a first velocity planned for an intelligent vehicle to travel in a first area, where the first area is an area in a process in which the intelligent vehicle travels to a destination; and obtaining a second velocity planned for the intelligent vehicle to travel in the first area, where the second velocity is obtained based on a collision potential energy, where the first velocity and the second velocity each include a direction and a magnitude; and the first velocity, the second velocity, and a risk of a collision between the intelligent vehicle and a surrounding obstacle are used to determine an optimal velocity of the intelligent vehicle, and the optimal velocity includes a magnitude and a direction.

It should be understood that, in this embodiment of this application, the processor 701 may be a CPU, or the processor 701 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like.

Optionally, the controller 700 may include a plurality of processors. For example, FIG. 16 includes a processor 701 and a processor 706. The processor 701 and the processor 706 may be different types of processors, and each processor includes one or more chips.

The memory 702/704 may include a read-only memory and a random access memory, and provide instructions and data to the processor 701. The memory 702/704 may further include a nonvolatile random access memory. For example, the memory 702/704 may further store information about a device type.

The memory 702/704 may be a volatile memory or a nonvolatile memory, or may include both a volatile memory and a nonvolatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. For example but not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 705 may further include a power bus, a control bus, a status signal bus, and the like. However, for clear description, various types of buses in the figure are denoted as the bus 705. Optionally, the bus 705 may be an in-vehicle Ethernet or controller area network (controller area network, CAN) bus or another internal bus.

It should be understood that the controller in this embodiment of this application may be corresponding to the apparatus 500 and the apparatus 600 in the embodiments of this application, and may be corresponding to corresponding execution bodies of the methods shown in FIG. 3A to FIG. 4C in the embodiments of this application. The foregoing and other operations and/or functions of the modules in the controller 700 are respectively used to implement corresponding procedures of the methods in FIG. 3A to FIG. 4C. For brevity, details are not described herein again.

In another possible implementation, the processor 701 of the controller 700 shown in FIG. 16 may invoke the program code stored in the memory 702/704 to perform the following operations:

calculating a collision potential energy of a surrounding obstacle of an intelligent vehicle based on first sensing data, where the first sensing data includes a relative velocity and a relative distance between the surrounding obstacle and the intelligent vehicle;

determining, based on the collision potential energy of the surrounding obstacle, a safe velocity for the intelligent vehicle to travel in a first area, where the first area is an area on a planned path of the intelligent vehicle; and controlling the intelligent vehicle to travel at the safe velocity in the first area.

It should be understood that the controller 700 in this embodiment of this application may be corresponding to the apparatus 500 and the apparatus 600 in the embodiments of this application, and may be corresponding to corresponding execution bodies of the methods shown in FIG. 3A to FIG. 4C in the embodiments of this application. The foregoing and other operations and/or functions of the modules in the controller 700 are respectively used to implement corresponding procedures of the methods in FIG. 3A to FIG. 4C. For brevity, details are not described herein again.

This application further provides the intelligent vehicle shown in FIG. 1 or FIG. 2. The intelligent vehicle includes the controller 700 shown in FIG. 16. The controller 700 is configured to implement corresponding procedures of the foregoing methods in FIG. 3A to FIG. 4C. For brevity, details are not described herein again.

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application. Any variation or replacement readily figured out by a person skilled in the art based on the specific implementations provided in this application shall fall within the protection scope of this application.

What is claimed is:

1. A vehicle control method comprising:
obtaining a first velocity planned for an intelligent vehicle to travel in a first area, wherein the first area is an area in a process in which the intelligent vehicle travels to a destination;
obtaining, according to a collision potential energy, a second velocity planned for the intelligent vehicle to travel in the first area, wherein the collision potential energy is used to identify a trend of a collision between a surrounding obstacle and the intelligent vehicle;
obtaining, according to the first velocity, the second velocity and a collision risk, an optimal velocity of the intelligent vehicle, wherein the collision risk indicates a risk of a collision between the intelligent vehicle and the surrounding obstacle; and
controlling the intelligent vehicle to travel at the optimal velocity in the first area,
wherein the first velocity, the second velocity and the optimal velocity each comprise a direction and a magnitude;
wherein when all the surrounding obstacles with a preset safety risk level are distributed in four quadrants, the method further comprises:
identifying a maximum safe angle in an obstacle-free area;
using a direction of an angular bisector of the maximum safe angle as a direction of the second velocity; and
using a magnitude greater than or equal to a magnitude of a maximum velocity of the surrounding obstacles as a magnitude of the second velocity;
wherein when all the surrounding obstacles with the preset safety risk level are distributed in three quadrants, the method further comprises:
calculating a collision potential energy combination or an orthogonal direction of a collision potential energy combination in an obstacle-free quadrant;
using a combination of all directions in the collision potential energy combination or the orthogonal direction of the collision potential energy combination in the obstacle-free quadrant as a direction of the second velocity; and
using a magnitude greater than or equal to a magnitude of a maximum velocity of the surrounding obstacles as a magnitude of the second velocity;
wherein when all the surrounding obstacles with the preset safety risk level are distributed in two adjacent quadrants, the method further comprises:
calculating a combination of orthogonal directions of collision potential energy combinations in an obstacle-free quadrant as a direction of the second velocity; and using a magnitude greater than or equal to a magnitude of a maximum velocity of all the surrounding obstacles with the preset collision risk level as a magnitude of the second velocity; or
calculating a collision potential energy combination of all surrounding obstacles with the preset collision risk level in a same quadrant; determining an orthogonal direction of each collision potential energy combination; comparing collision potential energy combinations in the two quadrants in an obstacle-free quadrant; and performing one of:
when the collision potential energy combinations in the two quadrants are equal, calculating a combination of the collision potential energy combinations in the two quadrants, and using the combination of the collision potential energy combinations in the two quadrants as the second velocity, wherein a direction of the combination of the collision potential energy combinations in the two quadrants is a direction of the second velocity, and a magnitude of the combination of the collision potential energy combinations in the two quadrants is a magnitude of the second velocity; or
when the collision potential energy combinations in the two quadrants are not equal, calculating a combination of orthogonal directions of the collision potential energy combinations in the two quadrants, and using the combination of the orthogonal directions of the collision potential energy combinations in the two quadrants as the second velocity, wherein a magnitude of the orthogonal direction of the collision potential energy combination is a magnitude of the collision potential energy combination, and a direction of the orthogonal direction of the collision potential energy combination is a direction perpendicular to the collision potential energy combination;
wherein when all the surrounding obstacles with the preset safety risk level are distributed in two non-adjacent quadrants, the method further comprises:
separately calculating a collision potential energy combination of all surrounding obstacles with the preset collision risk level in a same quadrant;
obtaining an orthogonal direction of each collision potential energy combination;
calculating a combination of orthogonal directions that are of collision potential energy combinations and that belong to a same quadrant, using any direction of the combination of the orthogonal directions that are of the collision potential energy combinations and that belong to the same quadrant as a direction of the second velocity; and
using a magnitude greater than or equal to a magnitude of a maximum velocity of the surrounding obstacles as a magnitude of the second velocity; and
wherein when all the surrounding obstacles with the preset collision risk level are distributed in only one quadrant, the method further comprises:

calculating a collision potential energy combination of all the surrounding obstacles with the preset collision risk level;
using an orthogonal direction of the collision potential energy combination as a direction of the second velocity; and
using a magnitude greater than or equal to a magnitude of a maximum velocity of the surrounding obstacles as a magnitude of the second velocity.

2. The method according to claim 1, wherein the method further comprises:
obtaining, according to a first sensing data, the collision potential energy, wherein the first sensing data comprises a relative velocity and a relative distance between the surrounding obstacle and the intelligent vehicle.

3. The method according to claim 1, wherein the method further comprises:
obtaining, according to the collision potential energy and a preset threshold, the collision risk, wherein levels of the collision risk level comprises safe, warning, and dangerous.

4. The method according to claim 1, wherein the method further comprises:
determining the first velocity as the optimal velocity when any one of the collision potential energy is less than a first threshold.

5. The method according to claim 1, wherein the method further comprises:
determining the second velocity as the optimal velocity when any one of the collision potential energy is greater than or equal to a first threshold.

6. The method according to claim 1, wherein the method further comprises:
displaying a risk of a collision between the intelligent vehicle and the surrounding obstacle, for the first velocity, and the second velocity by using a text on an in-vehicle display interface of the intelligent vehicle.

7. The method according to claim 1, wherein the method further comprises:
broadcasting a risk of a collision between the intelligent vehicle and the surrounding obstacle, the first velocity, and the second velocity using a voice.

8. The method according to claim 1, wherein the method further comprises:
providing a prompt indicting a risk of a collision between the intelligent vehicle and the surrounding obstacle through seat vibration.

9. The method according to claim 1, wherein the method further comprises:
providing a prompt of a risk of a collision between the intelligent vehicle and the surrounding obstacle through in-vehicle lamp flashing.

10. A vehicle control method, wherein the method comprises:
obtaining a collision potential energy of a surrounding obstacle of an intelligent vehicle based on first sensing data, wherein the first sensing data comprises a relative velocity and a relative distance between the surrounding obstacle and the intelligent vehicle, the collision potential energy is used to identify a trend of a collision between the surrounding obstacle and the intelligent vehicle;
obtaining, based on the collision potential energy of the surrounding obstacle, a safe velocity for the intelligent vehicle to travel in a first area, wherein the first area is an area on a planned path of the intelligent vehicle; and
controlling the intelligent vehicle to travel at the safe velocity in the first area,
wherein when all the surrounding obstacles with a preset safety risk level are distributed in four quadrants, the method further comprises:
identifying a maximum safe angle in an obstacle-free area;
using a direction of an angular bisector of the maximum safe angle as a direction of the safe velocity; and
using a magnitude greater than or equal to a magnitude of a maximum velocity of the surrounding obstacles as a magnitude of the safe velocity;
wherein when all the surrounding obstacles with the preset safety risk level are distributed in three quadrants, the method further comprises:
calculating a collision potential energy combination or an orthogonal direction of a collision potential energy combination in an obstacle-free quadrant;
using a combination of all directions in the collision potential energy combination or the orthogonal direction of the collision potential energy combination in the obstacle-free quadrant as a direction of the safe velocity; and
using a magnitude greater than or equal to a magnitude of a maximum velocity of the surrounding obstacles as a magnitude of the safe velocity;
wherein when all the surrounding obstacles with the preset safety risk level are distributed in two adjacent quadrants, the method further comprises:
calculating a combination of orthogonal directions of collision potential energy combinations in an obstacle-free quadrant as a direction of the safe velocity; and using a magnitude greater than or equal to a magnitude of a maximum velocity of all the surrounding obstacles with the preset collision risk level as a magnitude of the safe velocity; or
calculating a collision potential energy combination of all surrounding obstacles with the preset collision risk level in a same quadrant; determining an orthogonal direction of each collision potential energy combination; comparing collision potential energy combinations in the two quadrants in an obstacle-free quadrant; and performing one of
when the collision potential energy combinations in the two quadrants are equal, calculating a combination of the collision potential energy combinations in the two quadrants, and using the combination of the collision potential energy combinations in the two quadrants as the safe velocity, wherein a direction of the combination of the collision potential energy combinations in the two quadrants is a direction of the safe velocity, and a magnitude of the combination of the collision potential energy combinations in the two quadrants is a magnitude of the safe velocity; or
when the collision potential energy combinations in the two quadrants are not equal, calculating a combination of orthogonal directions of the collision potential energy combinations in the two quadrants, and using the combination of the orthogonal directions of the collision potential energy combinations in the two quadrants as the safe velocity, wherein a magnitude of the orthogonal direction of the collision potential energy combination is a magnitude of the collision potential energy combination, and a direction of the orthogonal direction of the collision potential energy combination is a direction perpendicular to the collision potential energy combination;

wherein when all the surrounding obstacles with the preset safety risk level are distributed in two non-adjacent quadrants, the method further comprises:
separately calculating a collision potential energy combination of all surrounding obstacles with the preset collision risk level in a same quadrant;
obtaining an orthogonal direction of each collision potential energy combination;
calculating a combination of orthogonal directions that are of collision potential energy combinations and that belong to a same quadrant, using any direction of the combination of the orthogonal directions that are of the collision potential energy combinations and that belong to the same quadrant as a direction of the safe velocity; and
using a magnitude greater than or equal to a magnitude of a maximum velocity of the surrounding obstacles as a magnitude of the safe velocity; and wherein when all the surrounding obstacles with the preset collision risk level are distributed in only one quadrant, the method further comprises:
calculating a collision potential energy combination of all the surrounding obstacles with the preset collision risk level;
using an orthogonal direction of the collision potential energy combination as a direction of the safe velocity; and
using a magnitude greater than or equal to a magnitude of a maximum velocity of the surrounding obstacles as a magnitude of the safe velocity.

11. The method according to claim 10, wherein the method further comprises:
controlling the intelligent vehicle to travel at the safe velocity in the first area when a collision potential energy of any surrounding obstacle is greater than or equal to a first threshold.

12. The method according to claim 10, wherein the method further comprises:
obtaining a collision risk level of each surrounding obstacle based on a collision potential energy of the surrounding obstacle and a preset threshold, wherein the collision risk level comprises safe, warning, and dangerous.

13. The method according to claim 10, the method further comprises:
selecting all surrounding obstacles with a preset collision risk level; and
obtaining the safe velocity based on collision potential energies of all the selected surrounding obstacles with the preset collision risk level.

* * * * *